(12) United States Patent
Kawai

(10) Patent No.: US 6,880,011 B1
(45) Date of Patent: Apr. 12, 2005

(54) NETWORK COMMUNICATION SYSTEM

(76) Inventor: Shosaku Kawai, 1-10-3-1304, Shinkitano, Yodogawa-ku, Osaka-shi, Osaka 532-0025 (JP)

( * ) Notice: Subject to any disclaimer, the term of this patent is extended or adjusted under 35 U.S.C. 154(b) by 0 days.

(21) Appl. No.: 09/487,309

(22) Filed: Jan. 19, 2000

(30) Foreign Application Priority Data

Jan. 20, 1999 (JP) .......................................... 11-011600

(51) Int. Cl.$^7$ .......................................... G06F 15/173
(52) U.S. Cl. ...................................... 709/227; 709/224
(58) Field of Search ................................. 709/224, 227, 709/248

(56) References Cited

U.S. PATENT DOCUMENTS

| | | | | |
|---|---|---|---|---|
| 5,563,882 A | * | 10/1996 | Bruno et al. ................. 370/260 |
| 5,592,538 A | * | 1/1997 | Kosowsky et al. ....... 379/93.08 |
| 5,729,689 A | * | 3/1998 | Allard et al. ................ 709/228 |
| 5,745,686 A | | 4/1998 | Saito et al. |
| 5,796,395 A | | 8/1998 | de Hond |
| 5,818,836 A | | 10/1998 | DuVal |
| 5,864,670 A | * | 1/1999 | Hayashi et al. ............. 709/204 |
| 5,999,611 A | * | 12/1999 | Tatchell et al. ........ 379/211.02 |
| 6,038,542 A | * | 3/2000 | Ruckdashel .................... 705/9 |
| 6,049,796 A | * | 4/2000 | Siitonen et al. ................ 707/3 |
| 6,125,352 A | * | 9/2000 | Franklin et al. .............. 705/26 |
| 6,128,664 A | * | 10/2000 | Yanagidate et al. ......... 709/228 |
| 6,131,121 A | * | 10/2000 | Mattaway et al. .......... 709/227 |
| 6,148,403 A | | 11/2000 | Haneda et al. |
| 6,163,596 A | * | 12/2000 | Gelfer et al. .............. 379/67.1 |
| 6,163,804 A | * | 12/2000 | Matsui ....................... 709/219 |
| 6,185,616 B1 | * | 2/2001 | Namma et al. ............. 709/227 |
| 6,189,056 B1 | * | 2/2001 | Ogura et al. ................. 710/62 |
| 6,209,005 B1 | * | 3/2001 | Harker et al. ............ 715/501.1 |
| 6,212,175 B1 | * | 4/2001 | Harsch ....................... 370/338 |
| 6,233,577 B1 | * | 5/2001 | Ramasubramani et al. ..... 707/9 |
| 6,240,080 B1 | * | 5/2001 | Okanoue et al. ............ 370/338 |
| 6,256,671 B1 | * | 7/2001 | Strentzsch et al. .......... 709/227 |
| 6,269,406 B1 | * | 7/2001 | Dutcher et al. ............. 709/248 |
| 6,292,668 B1 | * | 9/2001 | Alanara et al. .............. 455/466 |
| 6,292,833 B1 | * | 9/2001 | Liao et al. .................. 709/229 |
| 6,377,569 B1 | * | 4/2002 | Tsujigawa et al. .......... 370/352 |
| 6,427,170 B1 | * | 7/2002 | Sitaraman et al. .......... 709/226 |
| 6,449,344 B1 | * | 9/2002 | Goldfinger et al. ...... 379/88.17 |
| 6,483,832 B1 | * | 11/2002 | Civanlar et al. ............ 370/390 |
| 6,512,930 B2 | * | 1/2003 | Sandegren ................... 455/518 |
| 6,513,066 B1 | * | 1/2003 | Hutton et al. ............... 709/227 |
| 6,587,882 B1 | * | 7/2003 | Inoue et al. ................. 709/227 |
| 6,622,174 B1 | * | 9/2003 | Ukita et al. ................. 709/246 |
| 2001/0006519 A1 | * | 7/2001 | Voit ........................... 370/352 |
| 2002/0024947 A1 | * | 2/2002 | Luzzatti et al. ............. 370/352 |
| 2002/0042826 A1 | * | 4/2002 | Gaus et al. ................. 709/227 |
| 2002/0054671 A1 | * | 5/2002 | Wiener et al. ........... 379/88.22 |
| 2002/0131406 A1 | * | 9/2002 | Johnson et al. ............. 370/352 |

FOREIGN PATENT DOCUMENTS

| | | |
|---|---|---|
| JP | 08-292923 | 5/1996 |
| JP | 09-154077 | 6/1997 |
| JP | 10-155121 | 6/1998 |
| JP | 12-257189 | 9/1998 |
| JP | 10-290264 | 10/1998 |
| JP | 10-322391 | 12/1998 |
| JP | 10-326244 | 12/1998 |

\* cited by examiner

Primary Examiner—Bunjob Jaroenchonwanit
(74) Attorney, Agent, or Firm—Nixon Peabody LLP; Donald R. Studebaker

(57) ABSTRACT

The object of the invention is to provide a network system capable of solving the problems above without applying excessive load to the host computer and enabling users to exchange views freely. The network communication system 1 comprises the host device 3, the first communication device 5, and the second communication device 7. The first communication device 5 in turn includes a primary connection information generating means 11, an identity information generating means 12, a major identity information generating means 13, and a transmitting means 14. The second communication device 7 includes a receiving means 15, a storage means 16, a display means 17, a selecting means 18, and a connecting means 19. Therefore, a network system capable of solving the problems above without applying excessive load to the host computer and enabling users to exchange views freely, is provided.

21 Claims, 33 Drawing Sheets

FIG.8

| NAME | ADDRESS | COMPANY | AGE | SEX | AUTHENTICATION | PHONE NO. |
|---|---|---|---|---|---|---|
| A | OSAKA | ○○ CO. | 35 | MALE | ---- | ○○-○○○-○○○○ |
| W | TOKYO | △△ SECURITIES | 23 | FEMALE | ---- | △△-△△△△-△△△△ |
| X | NAGOYA | □□ OIL CO. | 27 | MALE | ---- | □□-□□□-□□□□ |
| Y | SAPPORO | ×× SOFTWARE CO. | 30 | MALE | ---- | ×××-××××-×××× |
| Z | OSAKA | | 28 | FEMALE | ---- | ◎◎-◎◎◎-◎◎◎◎ |

FIG.11

| NAME | ADDRESS | COMPANY | AGE | SEX | | SOURCE PARTY | AUTHENTICATION | PHONE NO. |
|---|---|---|---|---|---|---|---|---|
| A | OSAKA | ○○ CO. | 35 | MALE | ----- | A | | ○○-○○○-○○○○ |
| B | TOKYO | △△ SOFTWARE | 27 | FEMALE | ----- | B | | △△-△△△△-△△△△ |
| C | KOBE | ×× UNIVERSITY | 20 | MALE | ----- | A | | ×××-×××-×××× |
| D | FUKUOKA | ×× TRADING | 42 | MALE | ----- | A | | ◎◎-◎◎◎-◎◎◎◎ |
| E | OSAKA | □□ ELECTRIC CO. | 52 | MALE | ----- | B | | □□-□□□-□□□□ |

FIG.13
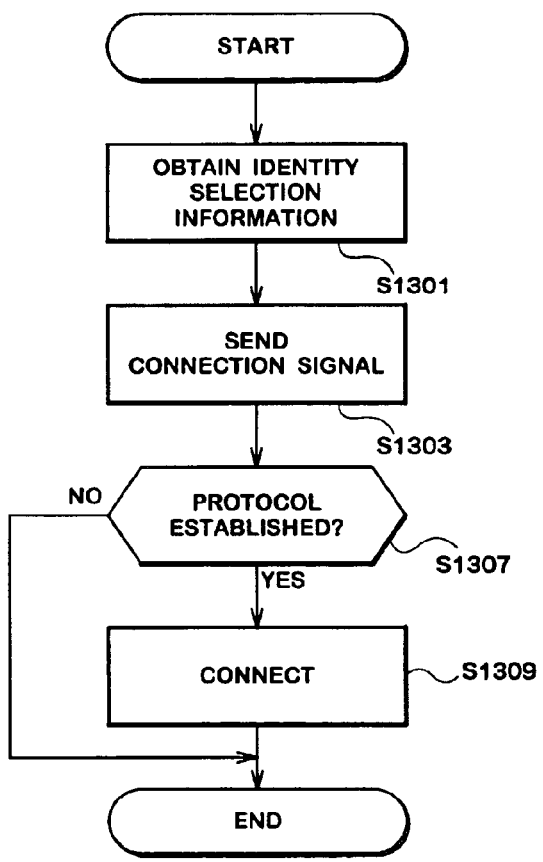
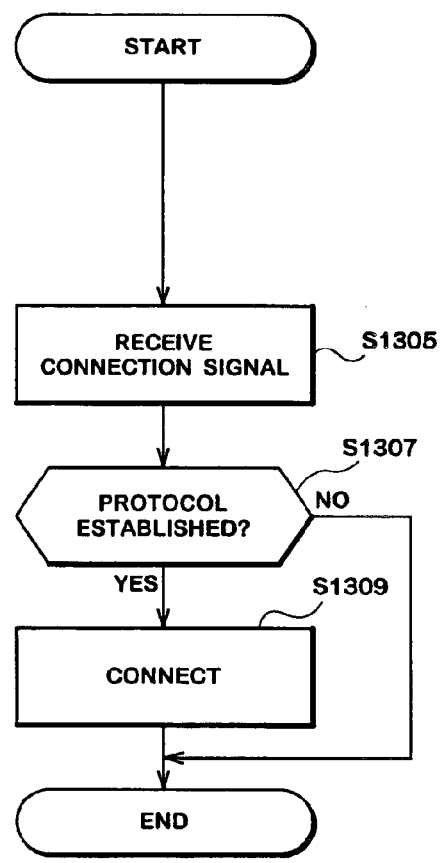

FIG. 18

| NAME | ADDRESS | COMPANY | AGE | SEX | | SOURCE PARTY | AUTHENTICATION | PHONE NO. |
|---|---|---|---|---|---|---|---|---|
| A | OSAKA | ○○ CO. | 35 | MALE | ---- | A | ○ | ○○-○○○-○○○○ |
| B | TOKYO | △△ SOFTWARE | 27 | FEMALE | ---- | B | | △△-△△△△-△△△△ |
| C | KOBE | ×× UNIVERSITY | 20 | MALE | ---- | C | ○ | ×××-×××-×××× |
| D | FUKUOKA | ×× TRADING | 42 | MALE | ---- | D | | ◎◎-◎◎◎-◎◎◎◎ |
| E | OSAKA | □□ ELECTRIC CO. | 52 | MALE | ---- | E | | □□-□□□-□□□□ |

FIG. 23

| NAME | ADDRESS | COMPANY | AGE | SEX | | SOURCE PARTY | AUTHENTICATION | PHONE NO. |
|---|---|---|---|---|---|---|---|---|
| A | OSAKA | ○○ CO. | 35 | MALE | ----- | A | ○ | ○○-○○○-○○○○ |
| E | OSAKA | □□ ELECTRIC CO. | 52 | MALE | ----- | E | ○ | □□-□□□-□□□□ |
| P | NAGOYA | ×TECHNICAL COLLEGE | 25 | MALE | ----- | P | ○ | ×××-××××-×××× |
| Q | SENDAI | ×LABORATORY | 44 | MALE | ----- | Q | | ◎◎-◎◎◎-◎◎◎◎ |
| R | OSAKA | □□ ELECTRIC CO. | 23 | FEMALE | ----- | R | ○ | □□-□□□-□□□□ |
| S | KANAZAWA | △BREWERY | 35 | MALE | ----- | S | | ×××-××××-×××× |
| T | NAHA | ○△AIRLINE | 27 | FEMALE | ----- | P | | ×××-××××-×××× |

FIG.25

| NAME | ADDRESS | COMPANY | AGE | SEX | | SOURCE PARTY | AUTHENTICATION | PHONE NO. |
|---|---|---|---|---|---|---|---|---|
| A | OSAKA | ○○ CO. | 35 | MALE | ---- | A,B | ○ | ○○-○○○-○○○○ |
| B | TOKYO | △△ SOFTWARE | 27 | FEMALE | ---- | B | | △△-△△△△-△△△△ |
| C | KOBE | ×× UNIVERSITY | 20 | MALE | ---- | C | ○ | ×××-××××-×××× |
| D | FUKUOKA | ×× TRADING | 42 | MALE | ---- | D | | ◎◎-◎◎◎-◎◎◎◎ |
| E | OSAKA | □□ ELECTRIC CO. | 52 | MALE | ---- | B,E | | □□-□□□-□□□□ |
| P | NAGOYA | ×TECHNICAL COLLEGE | 25 | MALE | ---- | B,P | | ×××-××××-×××× |
| Q | SENDAI | ×LABORATORY | 44 | MALE | ---- | B,Q | | ×××-××××-×××× |
| R | OSAKA | □□ ELECTRIC CO. | 23 | FEMALE | ---- | B,R | | □□-□□□-□□□□ |
| S | KANAZAWA | △BREWERY | 35 | MALE | ---- | B,S | | ○○○○-○○-○○○○ |
| T | NAHA | ○△ AIRLINE | 27 | FEMALE | ---- | B,P | | ○○○○-○○-○○○○ |
| | | | | | | | | |
| | | | | | | | | |

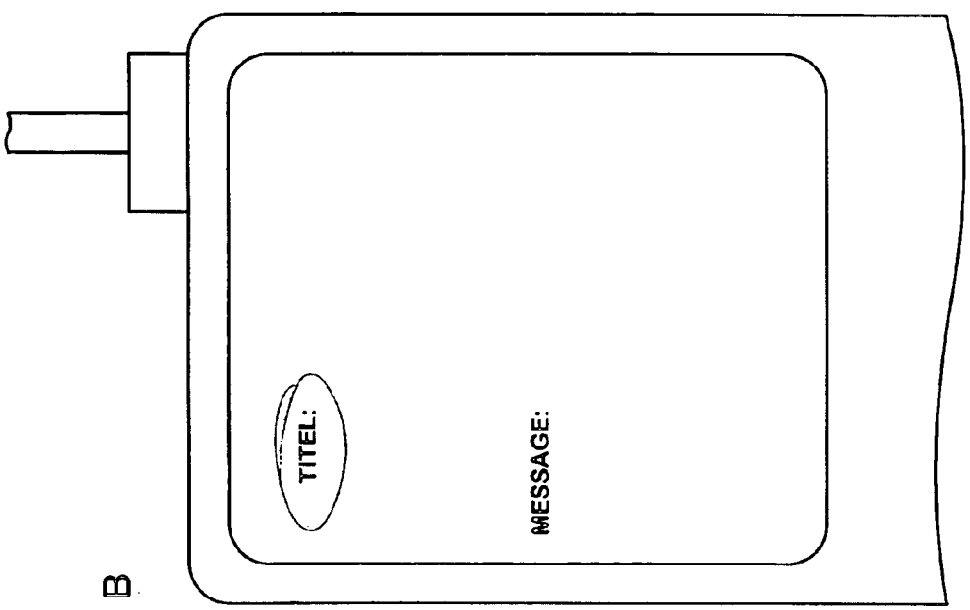
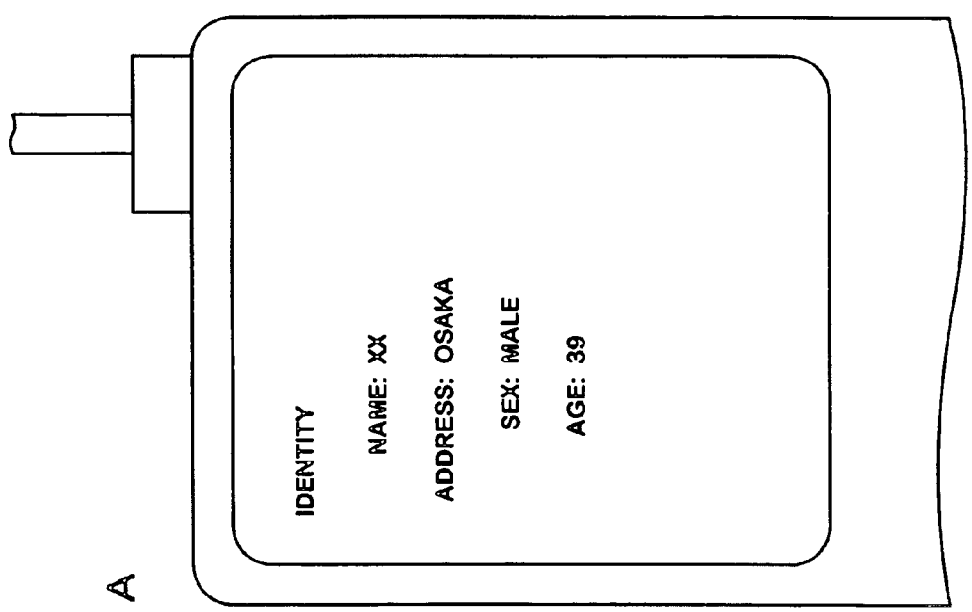
FIG. 32

FIG. 33
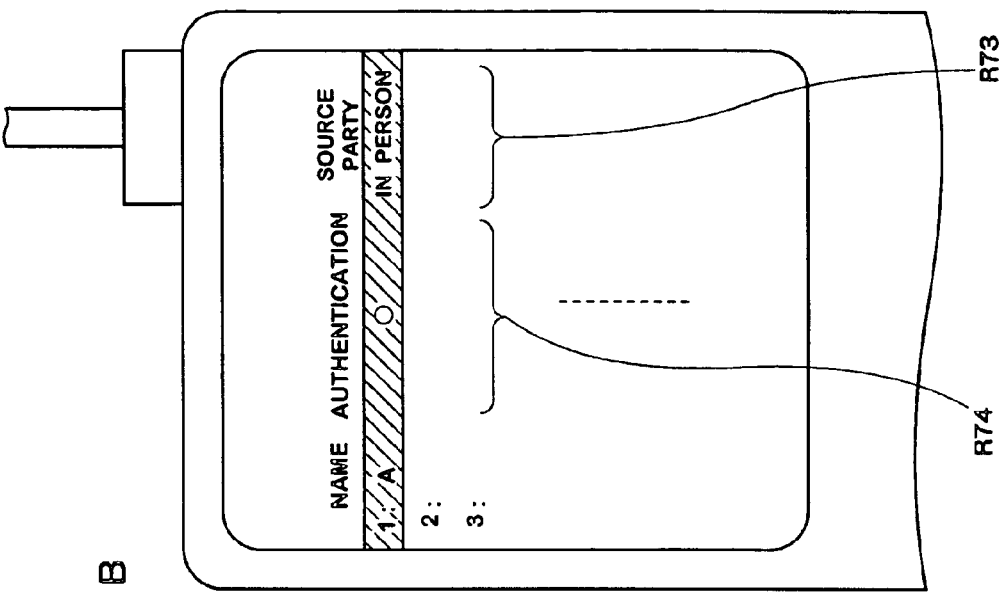
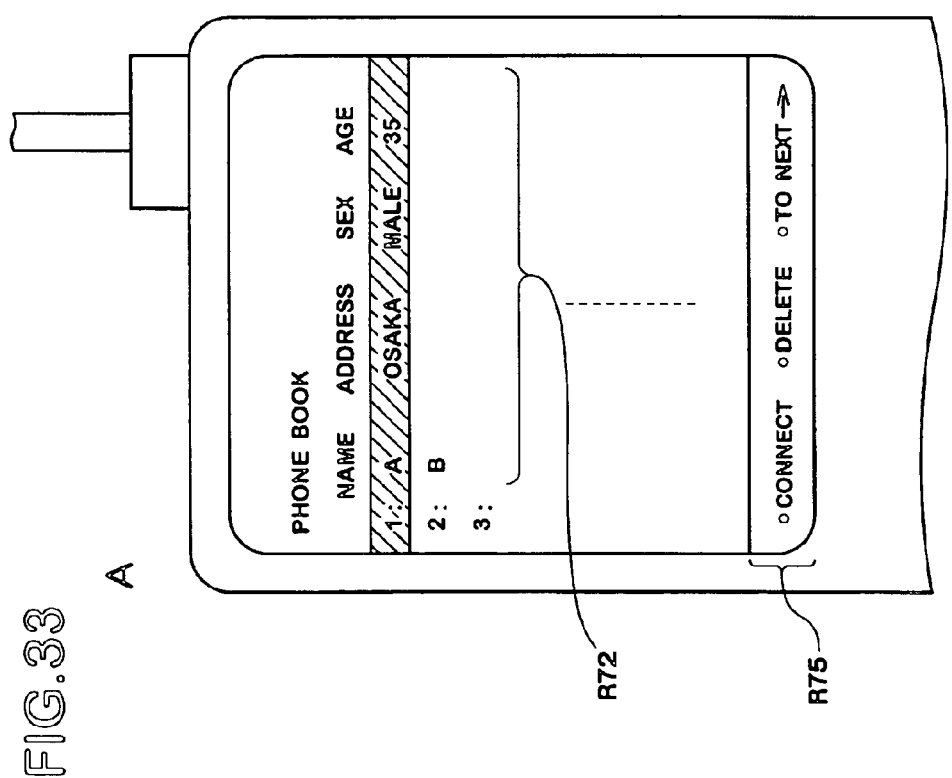

NETWORK COMMUNICATION SYSTEM

CROSS-REFERENCE TO RELATED APPLICATION

The entire disclosure of Japanese patent application No. Hei 11-11600 filed on Jan. 20, 1999 including the specification, claims, drawings and summary are incorporated herein by reference.

BACKGROUND OF THE INVENTION

1. Field of the Invention

This invention relates to a communication system, particularly to a communication system capable of making direct connections among communication apparatuses.

2. Description of the Prior Art

There has been conventionally a personal computer (PC) communication system as a communication system. The configuration of the personal computer communication is shown in FIG. 28. The communication system 100 has a host computer 105, and PCs 107 serving as communication terminals.

The host computer 105 offers an environment for smooth communication among users through meeting rooms and billboards provided for various topics. Users operate the PCs 107 to gain access to the host computer 105.

For example, a user can express his or her opinion about interesting remarks appearing on the billboard. To do so, the user prepares own opinion on his or her PC 107 and uploads it to the host computer 107. The user who uploaded the opinion can check if someone has uploaded an opinion on his or her opinion.

In this way, users can interact using the host computer 105 as a forum for exchanging views.

However, the conventional communication system 100 has problems as described below. It is one of the problems that, for the communication between the users the host computer 105 is always present between them.

The remarks made by the users are accumulated and laid open on the host computer 105. This means that the host computer 105 is required of a very large memory capacity and a high degree of processing ability. The wider the communication network, the more serious the requirement, because the number of users increases and the number of opinions also increases as the communication network becomes wider.

Another problem is that the host computer usually requires a supervisor to perform check and maintenance of the host computer 105. The supervisor coordinates the opinions in the meeting room, etc. to make communications smooth among the users. In the case a remark is made to abuse or slander a specific person, the supervisor may also delete such a remark. The authority of the supervisor has one aspect of making communication smooth and at the same time the other aspect of hindering free exchange of views.

Thus, the network having the host computer 105 as the center thereof has the problems of capacity, ability, and possible hindrance in free exchange of views.

SUMMARY OF THE INVENTION

The object of the invention is to provide a network system capable of solving the problems above without applying excessive load to the host computer and enabling users to exchange views freely.

A communication network system according to the present invention, characterized by comprising at least a host device, a first communication device, and a second communication device;

the first and second communication devices being interconnected by obtaining primary connection information from the host device;

if the first communication device prefers a direct call from the second communication device from the next time on:

the first communication device sending to the second communication device, primary connection information for connecting to the first communication device, and identity information for identifying the operator of the first communication device or the first communication device itself, excluding the primary connection information; and the second communication device storing and retaining the primary connection information and the identity information received from the first communication device;

at the time of connection from the next time on, displaying the identity information to the operator but not displaying the primary connection information; and calling up the first communication device according to the primary connection information corresponding to the identity information selected.

A method of the present invention for network communication through a network communication system having at least a host device, a first communication device, and a second communication device, characterized in that:

the first communication device sends to the host device, primary connection information for connecting to the first communication device, and major identity information for identifying the operator of the first communication device or the first communication device itself, excluding the primary connection information, the host device stores and retains the primary connection information and the major identity information received from the first communication device, the host device prevents the primary connection information from being disclosed to users of the communication devices trying to gain access to the host device, the host device discloses the major identity information to the users, the primary information corresponding to the major identity information selected from the second communication device is sent to the second communication device, and the second communication device is connected to the first communication device according to the primary connection information received.

Although the features of the invention are broadly described above, the configuration and contents of the invention together with its object and features will be clearer understood from the following disclosure in reference to the appended drawings.

BRIEF DESCRIPTION OF THE DRAWINGS

FIG. 8 shows phone numbers and self-introduction information stored in the HDD 53 of the host computer 23.

FIG. 10A shows a flow chart for obtaining the identification of the PC 25a.

FIG. 10B shows a flow chart for obtaining the identification of the PC 25b.

FIG. 11 shows an example of data structure of phone book (telephone directory) information.

FIG. 13A shows the operation of a PC on the connecting side when PCs are directly interconnected.

FIG. 13B shows the operation of a PC on the connected side when PCs are directly interconnected.

FIG. 18 shows changes in the phone book information as a result of obtaining an authentication.

FIG. 23 shows a data structure of correlation information possessed by a person B.

FIG. 25 shows a data structure of new correlation information produced by arranging together.

FIG. 32A shows a screen in which the identification of the cellular phone 75 is displayed.

FIG. 32B shows a message input screen of the cellular phone 75.

FIG. 33A shows an example of phone book screen of the cellular phone 75.

FIG. 33B shows an example of phone book screen of the cellular phone 75.

DESCRIPTION OF PREFERRED EMBODIMENTS

Figure 1:
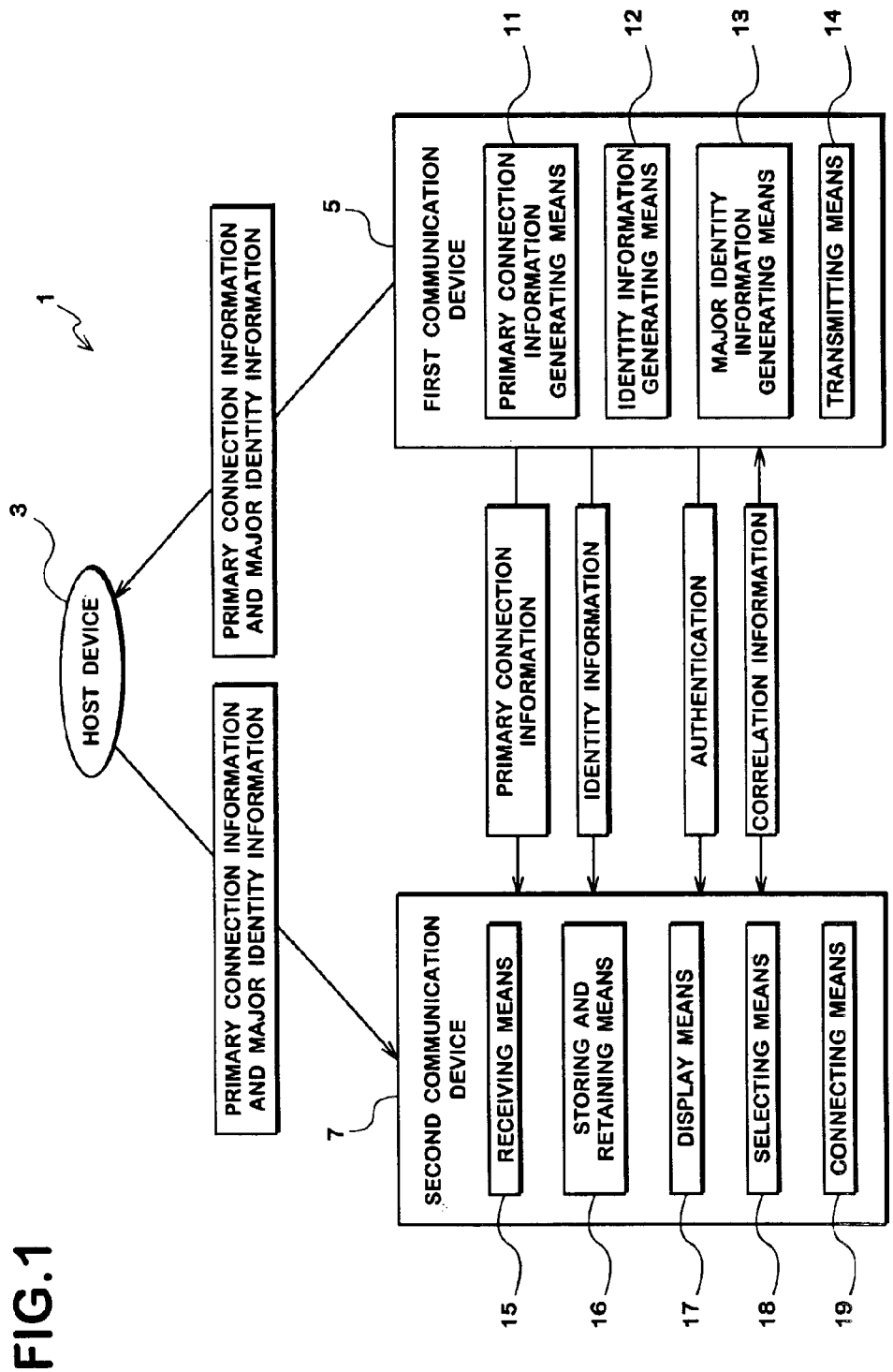
FIG. 1 is a functional block diagram, showing an embodiment of a network communication system according to the invention.

1. First Embodiment 1.1 Functional Block Diagram

A network communication system of the invention will be described in reference to FIG. 1 which shows a block diagram of a network communication system 1 including a host device 3, a first communication device 5, and a second communication device 7.

The first communication device 5 in turn includes a primary connection information generating means 11, an identity information generating means 12, a major identity information generating means 13, and a transmitting means 14. The second communication device 7 includes a receiving means 15, a storage means 16, a display means 17, a selecting means 18, and a connecting means 19.

The host device 3 stores and retains the primary connection information and major identity information it has received from the second communication device, prevents the primary connection information from being disclosed to users of the communication devices trying to gain access to the host device, discloses the major identity information to the users, and transmits the primary connection information corresponding to the major identity information selected by the first communication device 5 to the first communication device 5.

The first communication device 5 includes the primary connection information generating means 11 for generating primary connection information for making connection to the first communication device 5, the identity information generating means 12 for generating the identity information for identifying the operator or the communication device excluding the primary connection information, and a transmitting means 14 for transmitting the primary connection information and the identity information to other communication devices.

Further, the first communication device 5, when it prefers direct calls from the second communication device from the next time on, transmits to the second communication device the primary connection information for connecting to the communication device, and the information for identifying the communication device excluding the primary connection information.

It also includes the major identity information generating means 13 for generating the major identity information for identifying the operator or the communication device excluding the primary connection information, and the transmitting means 14 for transmitting the primary connection information and the major identity information to the host device.

It also transmits the primary connection information for connecting to the communication device and the major identity information for identifying the operator or the communication device excluding the primary connection information to the host device.

It also displays in a visible form the information on correlation between itself and other communication devices directly connected to it.

It also receives correlation information from other communication devices having such information and directly connected to it, arranges together the correlation information itself has and the received correlation information to form new correlation information, and displays the new correlation information in a visible form.

When any correlation information is selected from the correlation information, it also displays only the selected correlation information in a visible form.

The second communication device includes a receiving means 15 for receiving the primary connection information for connecting to other communication devices and the identity information for identifying the operator of the communication device or the communication device itself excluding the primary connection information, a storing and retaining means 16 for storing and retaining the primary connection information and the identity information received, a display means 17 for displaying the identity information and not displaying the primary connection information to the operator from the next time of connection on, a selecting means 18 for selecting specific identity information, and a connection means 19 for connecting to a communication device corresponding to the identity information and the primary connection information according to the primary connection information corresponding to the identity information selected.

Also the second communication device 7 stores and retains the primary connection information and the identity information received from the first communication device 5, displays the identity information to the operator, does not display the primary connection information from the next time of connection on, and calls up the first communication device 5 according to the primary connection information corresponding to the identity information selected.

Also the second communication device 7 is capable of transmitting the primary connection information and the identity information received from other communication devices to communication devices other than that corresponding to the primary connection information.

In the case the primary connection information and the identity information received from other communication device does not correspond to the communication device, a connection is made to a communication device that corresponds to the received primary connection information and receives from the connected communication device an authentication "the primary connection information and the identity information may be transmitted to other communication devices," and only after obtaining the authentication it can transmit the received primary connection information and the identity information to other communication devices.

It also displays in a visible form the correlation between itself and the communication device directly connected to it.

It also receives from other directly connected communication device the correlation information the communication device has, arranges the information together with the correlation information itself has, produces new correlation information, and displays the correlation information in a visible form.

If any correlation information is selected from the correlation information, it displays only the selected correlation information in a visible form.

Here, the phrase "primary connection information" refers to the information for connecting to a certain communication device. To put it concretely, it is for example a phone number, an IP address, etc.

The phrase "identity information" refers to the information for identifying the operator of a communication device or the communication device excluding the primary connection information. Concretely for example, it is a name, sex, age, occupation, company name, self-introduction, etc.

The phrase "major identity information" refers to the major information for identifying the operator of a communication device or the communication device excluding the primary connection information. Concretely for example, it is a name, sex, age, occupation, etc.

The phrase "correlation information" refers to the information indicating which of other communication devices a communication device is connected on the network communication system.

This arrangement is economically advantageous because it does not require a high performance, large capacity host device. It also provides a higher freedom in information exchange.

Network security is improved by the use of this communication device.

Similarly to the human society, the circle of acquaintances can be widened also in the network community.

An authentication can be given in such a simple operation as whether or not other communication device is to be connected.

The device can easily learn the partner it has connected.

The device that has made the connection can also visually confirm the device itself, so the connection relation can be recognized in a wider perspective.

Furthermore, information on which route should be followed to reach the communication device can be easily obtained.

Mutual communication can be established without being intermediated with a host device.

1.2 Hardware Constitution

Figure 2:
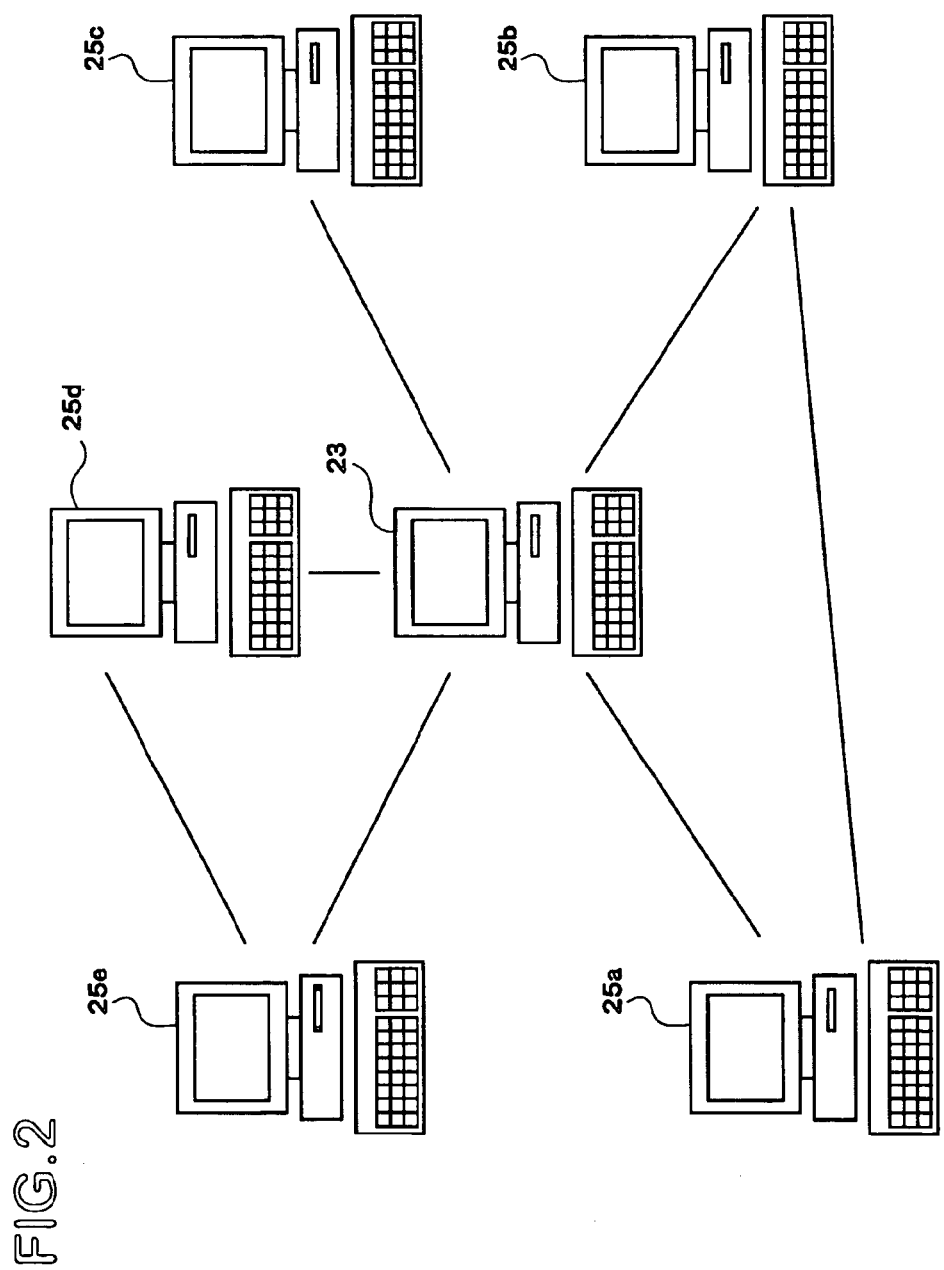
FIG. 2 shows a hardware arrangement of the network communication system shown in FIG. 1 embodied by the use of a host computer 23 and PCs 25.

The hardware arrangement of the network communication system shown in FIG. 1 is shown in FIG. 2. The network communication system 1 has a host computer 23 corresponding to the host device 3 in FIG. 1, and personal computers (PCs) 25 corresponding to the first and second communication devices 5 and 7 in FIG. 1.

The host computer 23 and each of the PCs 25 are interconnected through ISDN lines. Incidentally, the state of connection between the PCs 25 is shown in FIG. 2 only partially for simplicity.

Figure 3:
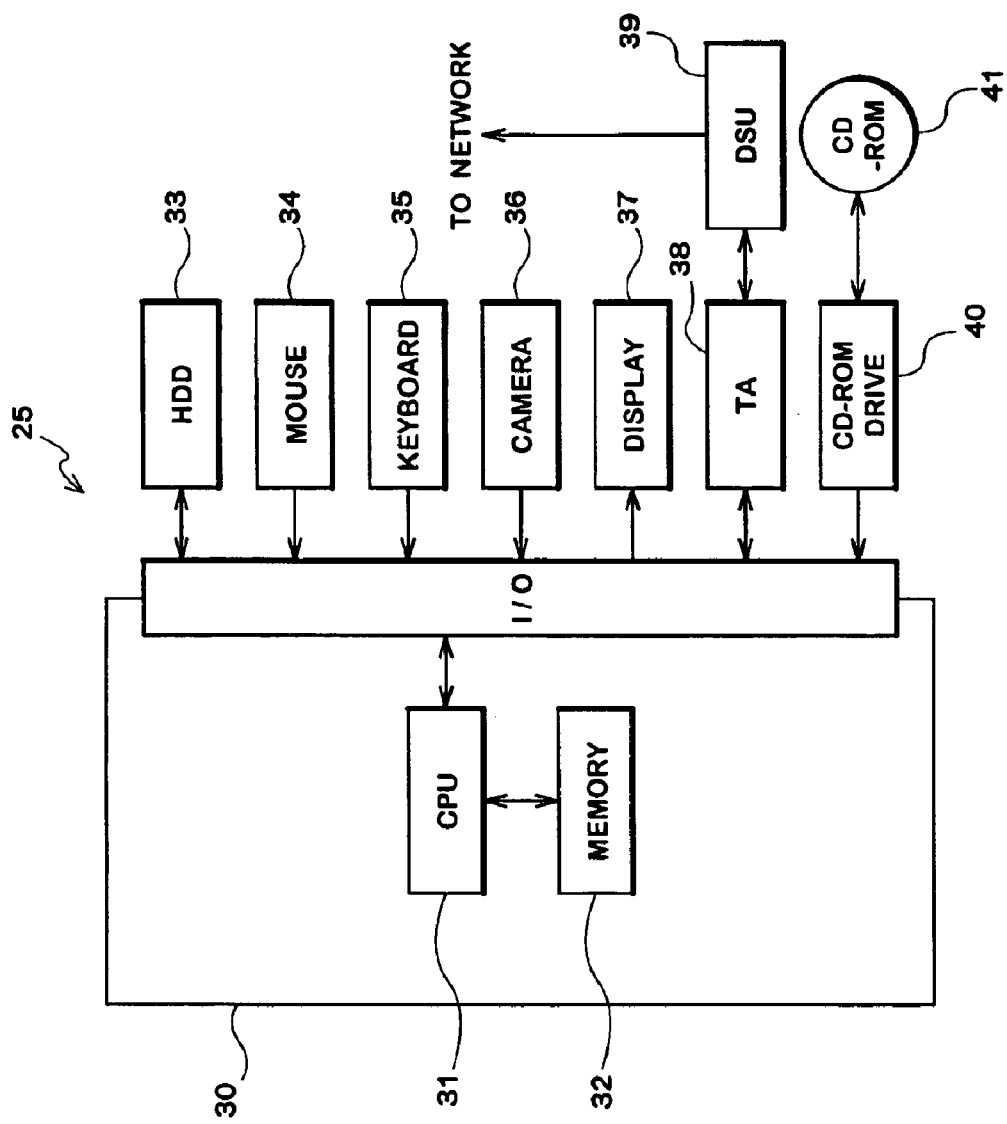
FIG. 3 shows the hardware arrangement of the PC 25 shown in FIG. 2.

Next, the hardware arrangement of the PC 25 is shown in FIG. 3. The PC 25 includes a main body 30 including a CPU 31 and a memory 32. The PC 25 also has external devices connected to the main body 30: an HDD 33, a mouse 34, a keyboard 35, a camera 36, a display 37, a terminal adapter (TA) 38, a DSU 39, and a CD-ROM drive 40.

In the HDD 33 is stored a communication program installed from a CD-ROM 41 through the CD-ROM drive 40 in the main body 30. The CPU 31 executes the communication program, stored in the HDD 33, through the memory 32.

The PC 25 receives instructions of an operator through the mouse 34 and the keyboard 35. A picture of the operator is taken in as graphics data through the camera 36.

The PC 25 shows the image processed with the CPU 31 on the display 37 for the operator. The PC 25 is connected to the ISDN line through the TA 38 and the DSU 39.

By the way, the communication program recorded in the CD-ROM 41 is used for executing the flow charts shown in FIGS. 5, 7A, 10A, 10B, 13A, 13B, 16A, 16B, 20A, and 20B.

Here, the correlation of components in the functional block diagram in FIG. 1 with the components in the PC 25 in FIG. 3 will be described. The primary connection information generating means 11 corresponds to the CPU 31; the identity information generating means 12 to the CPU 31, mouse 34, keyboard 35, and camera 36; the major identity information generating means 13 to the CPU 31; and the transmitting means 14 to the CPU 31, terminal adapter 38, and DSU 39, respectively.

The receiving means 15 corresponds to the CPU 31, terminal adapter 38, and DSU 39; storing and retaining means 16 to the memory 32 and the HDD 33; the display means 17 to the display 37; the selecting means 18 to the mouse 43 and keyboard 35; the connecting means 19 to the CPU 31, terminal adapter 38, and DSU 39, respectively.

Next, the correlation between the components mentioned in the claims and those of the PC 23 shown in FIG. 3 will be described. The identity information retaining means corresponds to the CPU 31, memory 32, HDD 33, mouse 34, keyboard 35, camera 36, TA 38, DSU 39, and CD-ROM drive 40; and the identity information display means to the CPU 31, memory 32, and display 37, respectively.

The correlation information retaining means corresponds to the CPU 31, memory 32, HDD 33, mouse 34, keyboard 35, TA 38, DSU 39, and CD-ROM drive 40. The identity information display means corresponds to the CPU 31, memory 32, and display 37.

Figure 4:
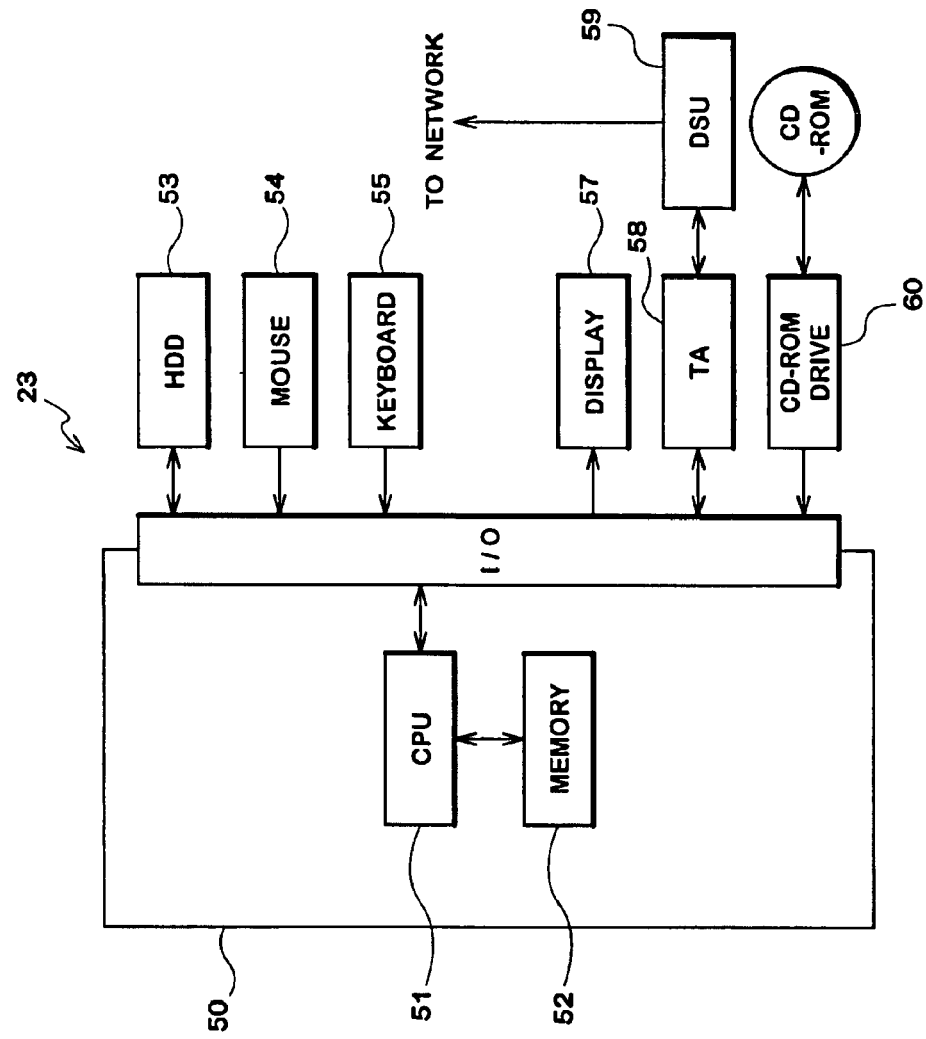
FIG. 4 shows the hardware arrangement of the host computer 23 shown in FIG. 2.

FIG. 4 shows the hardware arrangement of the host computer 23 which includes a main body 50 having a CPU 51 and a memory 52. The host computer 23 also has as external devices connected to the main body 50; an HDD 53, a mouse 54, a keyboard 55, a display 57, a terminal adapter (TA) 58, a DSU 59, and a CD-ROM drive 60.

1.3 Identification and Self-Introduction Information

Next, the process of making the identification as identity information will be described. The identification is made up of image information such as a portrait, and character information such as the name, age, etc. of a person. A program for generating the identification is installed in the PC 25. This program originally recorded on the CD-ROM 41 is installed in the HDD 33 through the CD-ROM drive 40. The user of the PC 25 can make an identification by following the procedure the program indicates.

Figure 5:
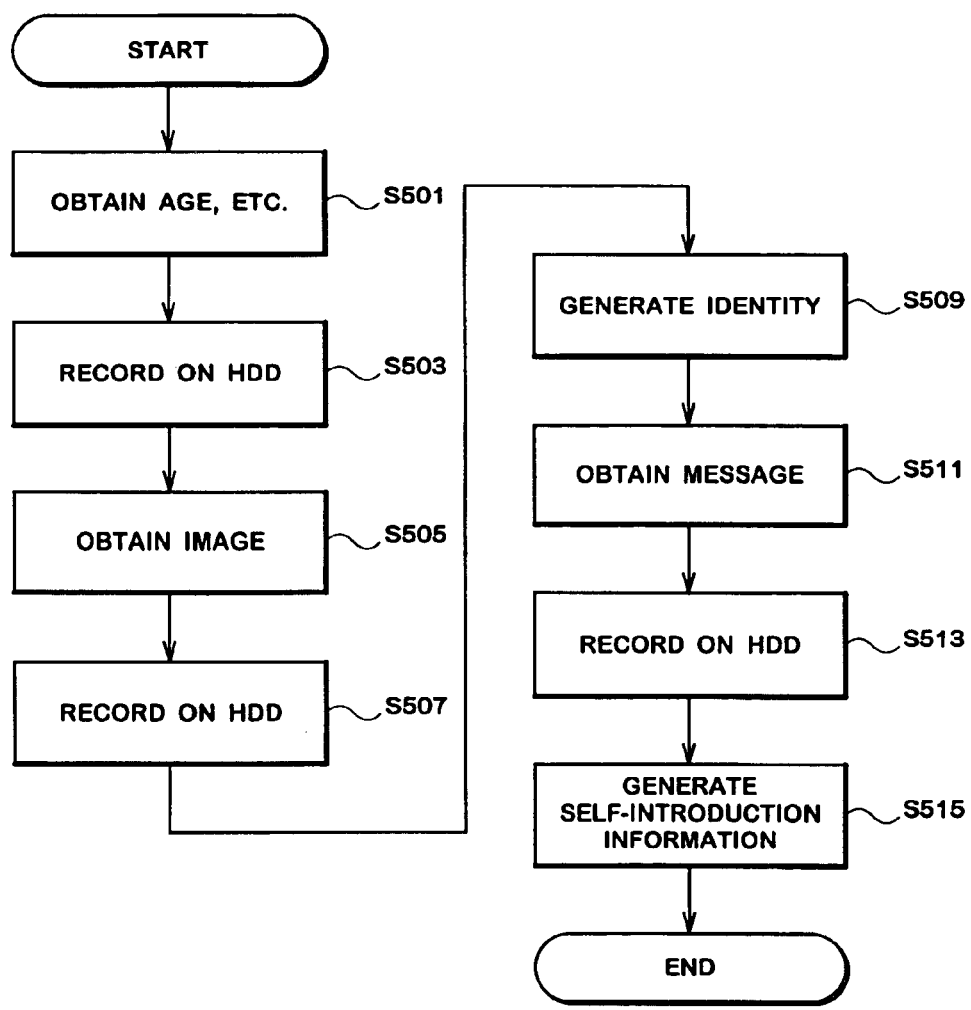
FIG. 5 shows the operation of generating an identification by means of the PC 25.

Operation of generating the identification are shown in FIG. 5. First, the user enters character information (name, address, sex, age, etc.) using the keyboard 35, etc. The CPU 31 acquires the information (S501) and records it on the HDD 33 (S503). Next, the CPU 31 receives image information (a portrait taken with the camera 36) (S505) and records it on the HDD 33 (S507). On the basis of the data, the CPU 31 generates the identification (image display) as shown in FIG. 6A (S509).

When a protocol is established and communication is made possible (S707), the PC 25 transmits the self-introduction information and the phone number data to the host computer 23 (S709). The host computer 23, upon receipt of the self-introduction information and the phone number data (S711), transmits a confirmation message of whether such information may be registered or not (S713).

The PC 25 receives the confirmation message (S715). If its contents are correct (S717), the PC 25 sends a registration request signal to the host computer 23 (S719). If the contents contain an error, etc., the self-introduction information and the phone number data are transmitted again (return to S709).

When the host computer 23 receives the registration request signal (S721), it registers the self-introduction information and the phone number data (S713).

In this way, the self-introduction information and the phone number data are accumulated in the HDD 53 of the host computer 23. FIG. 8 shows the self-introduction information and the phone number stored in the HDD 53 of the host computer 23. As shown in the figure, the self-introduction information and the phone number from a plural number of PCs 25 are accumulated in the HDD 53 of the host computer 23.

Incidentally the body of the message is stored not on the host computer 23 but on each of the PCs 25. This helps reduce the memory capacity of the host computer 23.

The self-introduction information recorded on the host computer 23 can be viewed on the PC 25 upon request from each PC 25. However, phone numbers are arranged not to be viewed.

Figure 7:
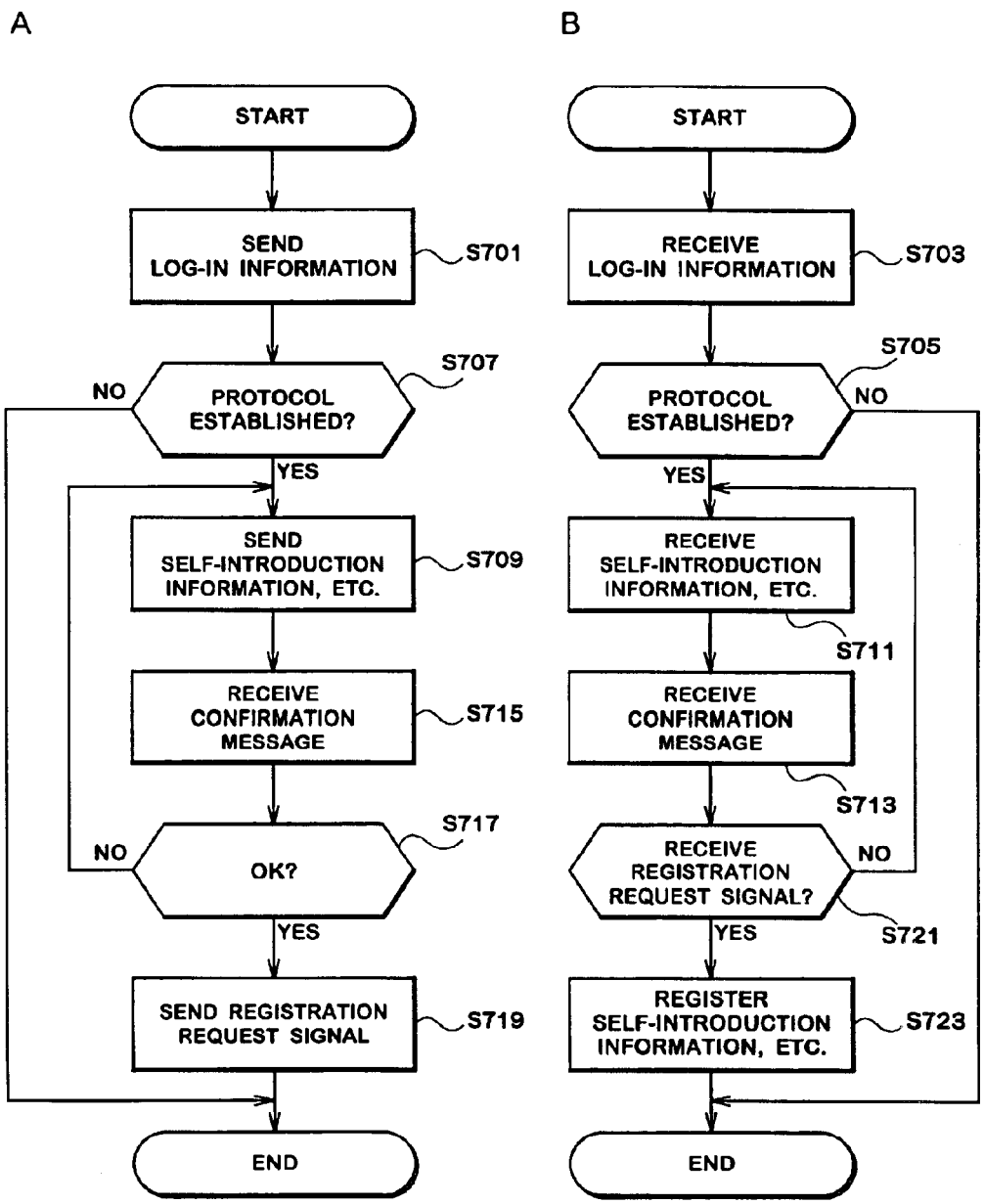
FIG. 7A shows a flow chart for processing a program stored in an HDD 33 by means of the PC 25.
FIG. 7B shows a flow chart for processing a program stored in an HDD 53 by means of the host computer 23.

Here, the correlation of the components mentioned in the claims with the steps of the flow chart in FIG. 7 will be described.

The transmitting means 14 performs the steps of 701 (S701), 707 (S707), 715 (S715), 717 (S717), and 719 (S719).

1.4 Obtaining an Identification

The self-introduction information and the phone number accumulated in the HDD 53 of the host computer 23 as described above are disclosed on a "meeting" page as shown in FIG. 9A. A person who wants a connection to a new person who has not been connected so far must confirm what kinds of people are introduced on the "meeting" page.

The "meeting" page is a place for disclosing to third parties the self-introduction information accumulated on the HDD 53 of the host computer 23. The meeting page is also the place where, if the PC 25 selects any disclosed self-introduction information, it can directly contact the owner of the self-introduction information selected.

In FIG. 6A, while the identification is made up of the image information and the character information, it may be made up of the image information only or the character information only. Also, while the character information is described to include the name, address, sex, age, etc., the information is not limited to those. For example, the identification may be constituted with a combination of one or more of those pieces of information (for example, name only, name and address only, etc.). However, the identification is arranged not to include the primary connection information (in this embodiment, the phone number).

Next, the user enters a message using the keyboard 35, etc. according to the input image shown in FIG. 6B. As shown in FIG. 6B, the message comprises a title and a message body. The CPU 31, upon receipt of the message (S511), records it on the HDD 33 (S513).

When the message entry is over, the PC 25 generates self-introduction information from the entered information (S515). Here, the extracted pieces of information on self-introduction are the name, address, sex, and message title. The message body is not included in the self-introduction information.

On the other hand, the phone number of the ISDN line used by the PC 25 (hereinafter simply referred to as the phone number) is entered using the keyboard 35, etc. In this embodiment, the phone number corresponds to the primary connection information.

Next, the correlation of the components mentioned in the claims with the steps of the flow chart in FIG. 5 will be described.

The identity information generating means 13 performs the steps of 501 (S501), 503 (S503), 505 (S505), 507 (S507) and 509 (S509).

The major identity information generating means 15 performs the step 515 (S515).

The self-introduction information and the phone number are registered on the host computer 23. This procedure will be described in reference to FIG. 7. Here, FIG. 7A shows the processing of a program recorded on the HDD 33 of the PC 25, and FIG. 7B shows the processing of a program recorded on the HDD 53 of the host computer 23.

First, the PC 25 transmits log-in information to be logged in the host computer 23 (S701). Upon receipt of the log-in information (S703), the host computer 23 determines if the partner is appropriate for establishing a communication protocol (S705). If it determines that a protocol may be established, it establishes the protocol between itself and the PC 25 to bring about a state of permitting communication.

The host computer 23, upon finishing the connection to the PC 25, displays an initial screen as shown in FIG. 9B. The operator of the PC 25, by selecting the "meeting" on this initial screen, can be connected to a meeting page shown in FIG. 9A In FIG. 9A, the name, sex, address, and age are extracted from the self-introduction information as the information disclosed in the "meeting." On the other hand, the phone number is hidden. Incidentally, the pieces of information disclosed here are not limited to those mentioned above as long as the information is for the self-introduction.

Figure 10:
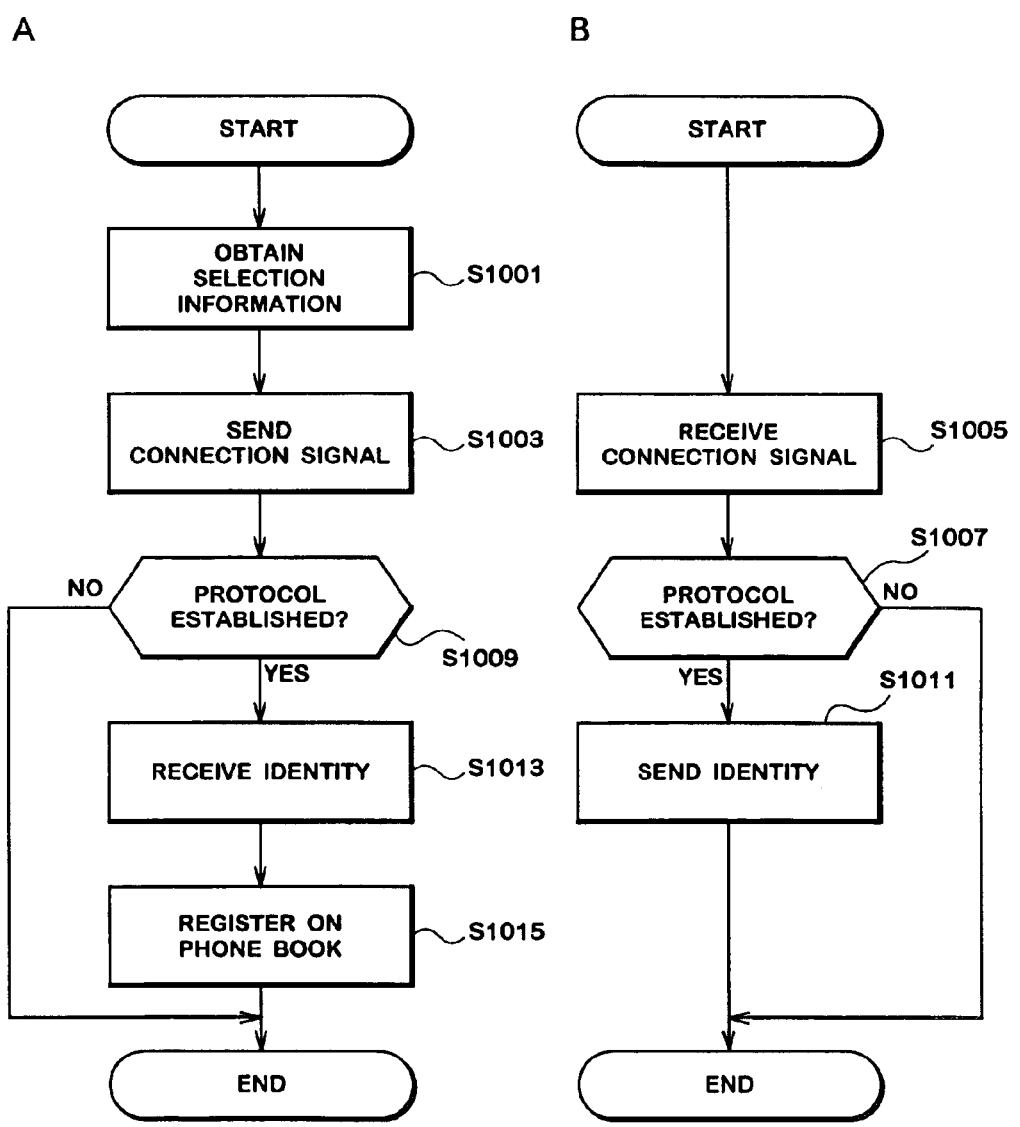

Here, the process through which each of the PCs obtains the identification will be described by way of an example in which a PC 25a obtains the identification of a PC 25b in reference to FIG. 10. FIG. 10A shows the operation of the PC 25a on the connecting side (the side requesting the identification) and FIG. 10B shows the operation of the PC 25b on the connected side (the side providing the identification).

The PC 25a, when it is connected to the "meeting" page, downloads the self-introduction information and the phone number carried on that page, temporarily holds them on a RAM region of the memory 32, and shows the downloaded self-introduction information on the display 37.

The operator of the PC 25a, using the mouse 34, selects the self-introduction information of an intended person among the self-introduction information shown on the display 37. At this time, a selection signal is sent to the CPU 31. The CPU 31, upon receipt of the selection signal (S1001), reads from the RAM region the phone number corresponding to the intended self-introduction information according to the received selection signal. The PC 25, in order to connect to the PC 25b corresponding to the phone number (hereinafter called the corresponding PC), makes a phone call through the TA 38 and the DSU 39 to send a connection signal (S1003). At the same time, the PC 25a is disconnected from the host computer 23.

The corresponding PC 25b, upon receipt of the connection signal (S1005), determines if a protocol for a direct mutual connection between the PCs can be established (S1007, S1009). When the protocol is established, the corresponding PC 25b sends the identification and the message body recorded on the HDD 33 to the PC 25a (S1011).

The PC 25a, upon receipt of the identification and the message body (S1013), records the identification on a phone book file of the HD 33 (S1015).

Here, the correlation of the components mentioned in the claims with the steps of the flow chart in FIG. 10 will be described.

The receiving means 15 performs a step 1013 (S1013). The storage and retention means 16 performs a step 1015 (S1015).

Next, the phone book will be described. The phone numbers and identifications obtained are automatically registered on the phone book. The phone book is arranged that a PC can easily connect to a party by simply selecting the identification shown on the screen.

In this embodiment, the phone book information the phone book contains is made up of phone numbers, identifications, source party information, and authentication information. The source party information shows from where the identification is obtained. The authentication information will be described later.

FIG. 11 shows an example of data structure of the phone book information. The identifications of a person A and a person B are obtained directly from those persons. Therefore, the contents of the source party boxes and the name boxes are identical each other. On the other hand, the identifications of persons C, D, and E are obtained not directly but through third parties; for the persons C and D through the person A, and for the person E through the person B. Therefore, the contents of the source party boxes and the name boxes are not identical.

The phone number is temporarily stored in the RAM region by the connection to the "meeting," made to correspond to the obtained identification by the direct connection to the corresponding PC 25b, and recorded as part of the phone book information.

Figure 12:
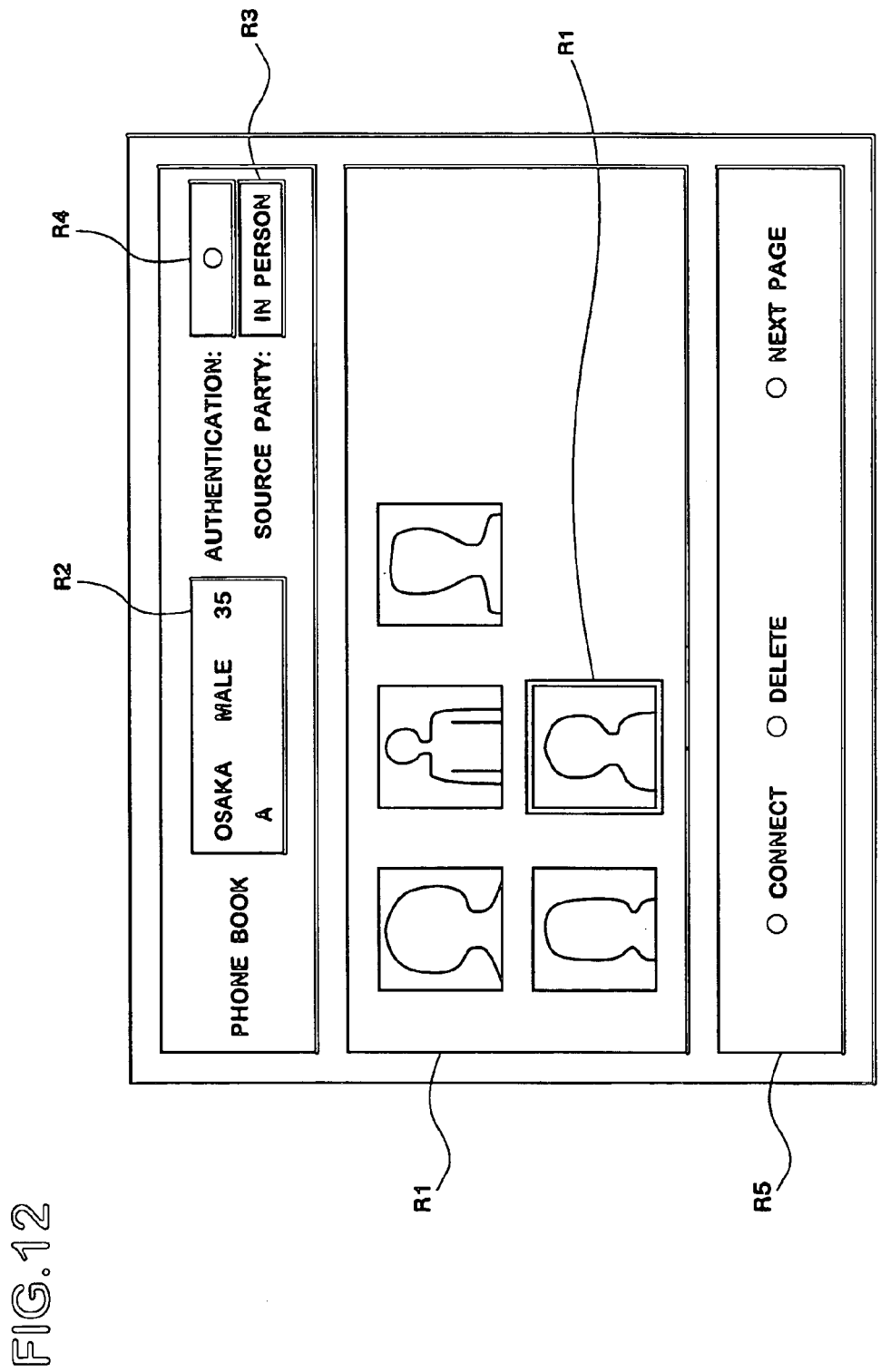
FIG. 12 shows an example of user interface of a phone book.

FIG. 12 is a phone book image on the display 37 shown according to the phone book file of the HDD 33. The displayed image of the phone book includes an image display region R1 for displaying an image, a personal information display region R2 for displaying personal information, a source party display region R3, an authentication display region R4, and an operation display region R5 for displaying operations.

On the image display region R1 is shown the image information (portrait, etc.) out of the identification. On the personal information display region R2 is shown whole or part of character information out of the identification. This embodiment is arranged to show the name, address, sex, and age. When a specific person is selected from the image display region R1, the image of the person is surrounded with a frame F1. At the same time, information relating to the person is shown in the personal information display region R2.

On the source party display region R3 is shown from whom the selected identification is obtained. On the authentication display region R4 is shown whether an authentication is obtained for the selected identification from the owner of the selected identification. If the authentication is obtained, a circle (○) is shown and, if not, nothing is shown.

On the operation display region R5 are shown buttons for functions such as connection to the identification selected, deletion of the selected identification, etc. To connect to the party of the selected identification, the connection button is pressed. Thus, the CPU 31 of the PC 25 can obtain the phone number of the selected identification from the HDD 33. And a phone call is made according to the obtained phone number through the TA 38 and the DSU 39 to make a direct connection to the party called.

By the way, a phone number stored in the RAM region that has not been connected directly to any party and has not obtained any identification is deleted at an appropriate time and is not stored.

Here, the correlation of the components mentioned in the claims with the images shown on the display 37 in FIG. 12 will be described. The identity information display region corresponds to the image display region R1, the detailed information display region to the personal information display region R2, the source party information display region to the source party display region R3, and the authentication information display region to the authentication display region R4, respectively.

1.5 Direct Connection Between PCs

To connect the PC 25 to a person (or PC) registered in the phone book, the operator selects an intended person from the phone book, and presses the connection button. Then the PC 25 automatically calls and connects to the party. Unlike in the conventional procedure, there is no need for connecting to the host computer 23.

The steps of the PCs when they connect to each other are described using the flow chart shown in FIG. 13. FIG. 13A shows the operation of the PC on the connecting side and FIG. 13B shows the operation of the PC on the connected side.

First, the operator using the mouse 34, etc. selects a specific person from the phone book (See FIG. 12) shown on the display 37. The PC 25, upon receipt of an identification selection signal indicating that an identification is selected (S1301), calls up a party PC according to the phone number corresponding to the identification. When the call is put through, a signal for connection is transmitted (S1303).

The PC on the opposite side, upon receipt of the connection signal (S1305), determines if a protocol can be established with the opposite party (S1307). If the opposite party is determined to be appropriate for establishing a protocol, the connection is completed (S1309). The same applies to the PC on the connection signal sending side.

Here, the correlation of the components mentioned in the claims with the steps of the flow chart in FIG. 13 will be described.

The connection means 19 performs the steps of 1303 (S1303), 1307 (S1307), and 1309 (S1309).

1.6 Authentication

In this embodiment, in the case the phone number and the identification are obtained directly from the person in question, the identification can be transmitted to a third party. That is, introduction to the third party is permitted. However, it is arranged such that, in the case the phone number and the identification are obtained not directly from the person in question but through a third party, the phone number and the identification cannot be transmitted to a different third party.

Figure 14:
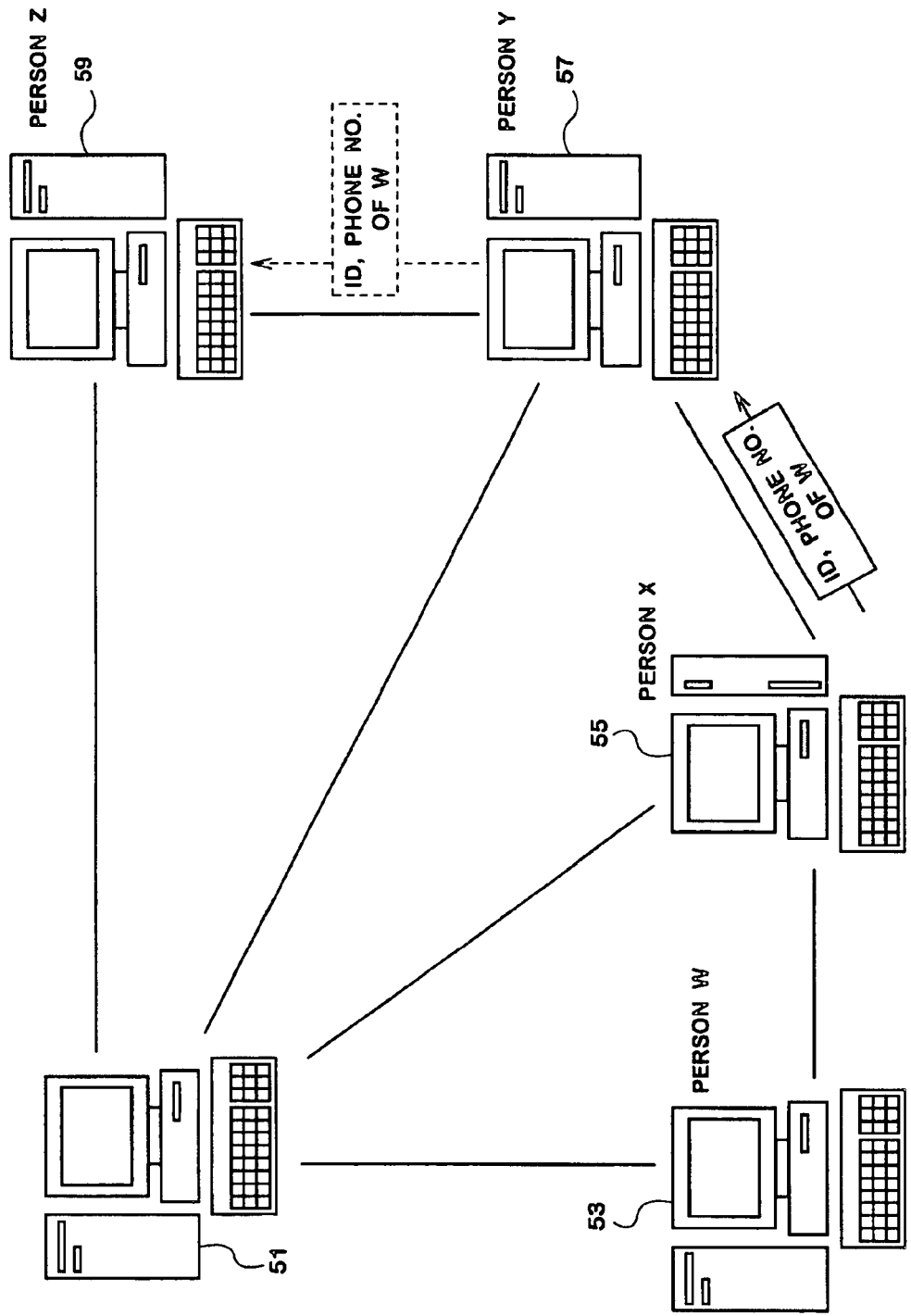
FIG. 14 shows an authentication process.

This will be concretely described in reference to FIG. 14. FIG. 14 shows a network in which a PC (PCW53) of a person W, a PC (PCX55) of a person X, a PC (PCY57) of a person Y, and a PC (PCZ59) of a person Z are connected to a host computer 51. Here, the lines interconnecting the PCs (for example PCW53 and PCX55) show the lines on which direct transmission or reception of the phone number or identification occurs.

Here, it is assumed that the person X is directly connected to the person W, obtains from the person W the phone number and the identification, and an authentication "the person X may transmit the identification and the phone number of the person W to a third party." In this case, the person X may transmit the identification and the phone number of the person W to the person Y, a third party other than the person W.

From the person X the person Y has received the identification and the phone number of the person W. Its is arranged that the person Y cannot transmit the identification and the phone number of the person W to the person Z.

As described above, this embodiment is arranged that the phone number and the identification may be transmitted to a third party only when the owner of the identification and the phone number is directly connected and an authentication is obtained from the owner to permit the transmission of the identification and the phone number to the third party.

Figure 15:
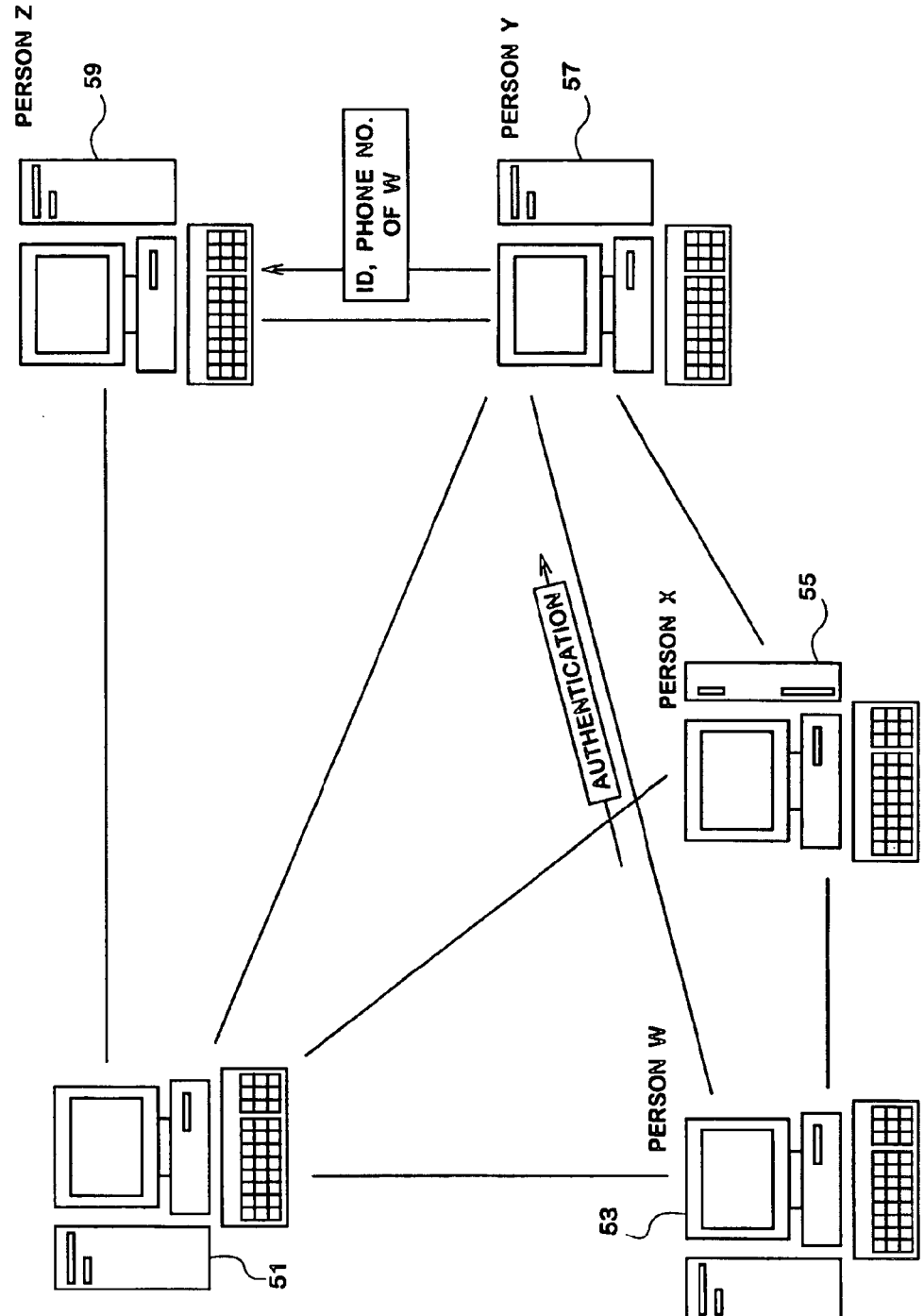
FIG. 15 shows an authentication process.

As shown in FIG. 15, if the person Y directly connects to the person W in person according to the identification and the phone number of the person W obtained from the person X, and gets an authentication, then the person Y can send the identification and the phone number of the person W to the person Z.

Figure 16:
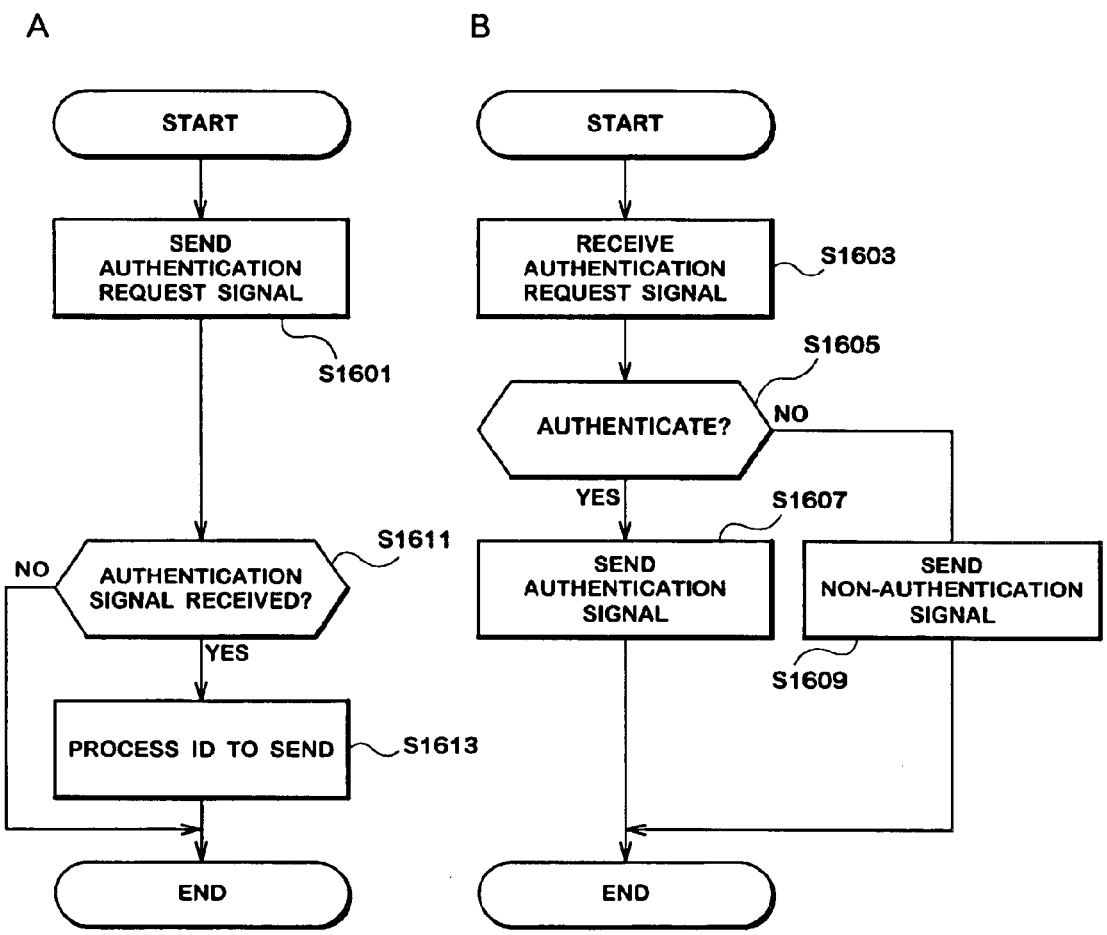
FIG. 16A shows the operation of a PC on the authentication requesting side.
FIG. 16B shows the operation of a PC on the authentication giving side.

Here, the steps of the PCs on the authentication requesting side and on the authentication giving side are shown in FIG. 16. FIG. 16A shows the operation of the PC on the authentication requesting side (corresponding to the PC (PCY57) of the person Y, hereinafter called the requesting side PC). FIG. 16B shows the operation on the authentication giving side (corresponding to the PC (PCW53) of the person W, hereinafter called the authentication side PC). Incidentally, it is assumed that the requesting side PC is directly connected to the authentication side PC according to the phone number obtained.

Figure 17:
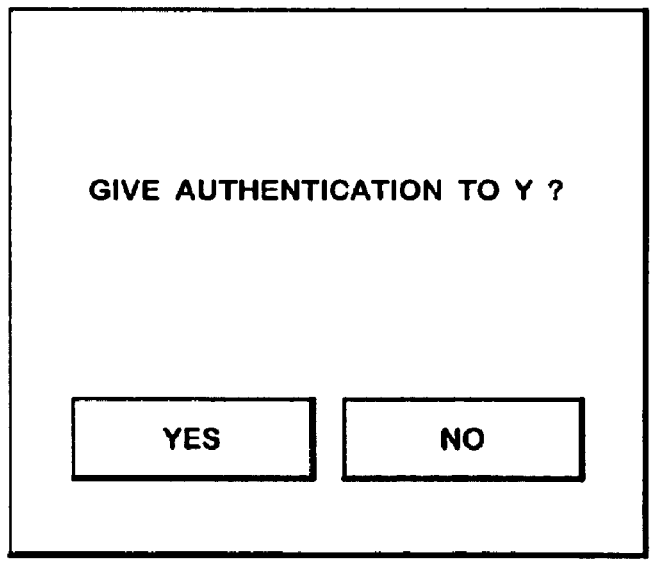
FIG. 17 shows a dialogue displayed when an operator is required of a decision if an authentication is to be given or not.

The requesting side PC sends an authentication requesting signal to the authentication side PC (S1601). The authentication side PC, upon receiving the authentication requesting signal (S1603), asks the operator of a decision if the authentication may be given or not (S1605). Here, dialogue as shown in FIG. 17 is shown to confirm the intention of the operator. The operator using the mouse 34, etc. selects "Give authentication" or "Do not give authentication."

If the operator selects "Give authentication," the authentication side PC sends an authentication signal (S1607). If the operator selects "Do not give authentication," a non-authentication (denial) signal is transmitted (S1609).

The requesting side PC determines if the authentication signal has been received (S1611). If received, a transmission permission process is applied to the identification to permit transmission to a third party (S1613).

Changes in the phone book information due to obtaining the authentication will be described in reference to FIG. 18. FIG. 18 shows a state in which some of the data shown in FIG. 11 have obtained authentication. In FIG. 11, the phone numbers and the identifications of the persons A and B are those obtained directly in person. Therefore, whether an authentication will be given or not may be asked when the connection is made. For example, if it is assumed that the person A gives an authentication while the person B does not, as shown in FIG. 18, a check (circle) is entered in the authentication box of the person A.

In FIG. 11, the phone numbers and the identifications of the persons C and D are those obtained not directly from those persons but through the person A. Therefore, in order to obtain authentication, first, direct contacts to the persons C and D are required. As the result of direct contact between the persons C and D, characters "A" in the source boxes of the persons C and D change to "C" and "D" respectively as shown in FIG. 18. If an authentication is obtained, a check mark is entered in the authentication box. FIG. 18 shows a case in which the person C obtains an authentication but the person D does not.

For the person E, the phone number and the identification are obtained not directly but through a third person B. Since a direct contact has not been made to the person E, the source party remains as "B." Therefore, no authentication has been obtained and no check mark has been entered in the authentication box.

As described above, this embodiment is arranged that the phone number and the identification may be transmitted to a third party only when a direct contact is made to the owner of the phone number and the identification and when an authentication is obtained to the effect that the phone number and the identification may be transmitted to the third party. However, the invention is not limited to the embodiment. For example, it may be arranged that the phone number and the identification may be transmitted to a third party by only a direct contact to the owner of the phone number and the identification. It may also be arranged that the phone number and the identification may be transmitted to a third party without making a direct connection to the owner of the phone number.

1.7 Display of Correlation Information

Next, the display of correlation information will be described. The correlation information represents any communication devices to which certain communication device is being connected on a network communication system. The correlation information is graphically shown on the display 37. The correlation information in this embodiment is made up of phone numbers, identifications, source party information, and authentication information, namely it is the same as the phone book information.

Figure 19:
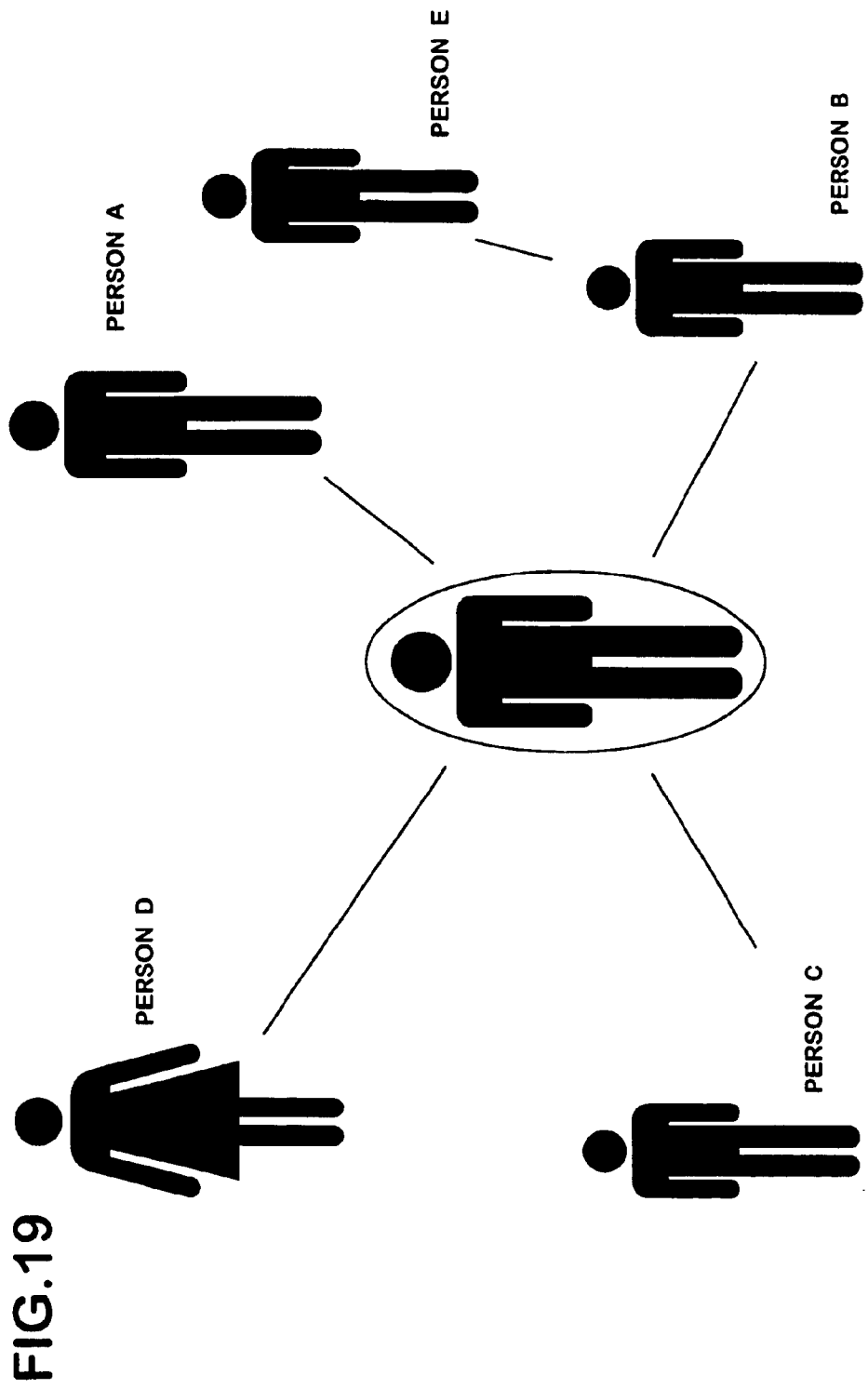
FIG. 19 shows a display 37 displaying the correlation with other persons according to correlation information.

For example, according to the correlation information shown in FIG. 18, the correlation of persons is graphically shown as FIG. 19. An operator, upon seeing the graphics image, can immediately learn the parties to whom he or she has connected directly. Incidentally in FIG. 19, the silhouette enclosed in an ellipse represents the operator.

Figure 20:
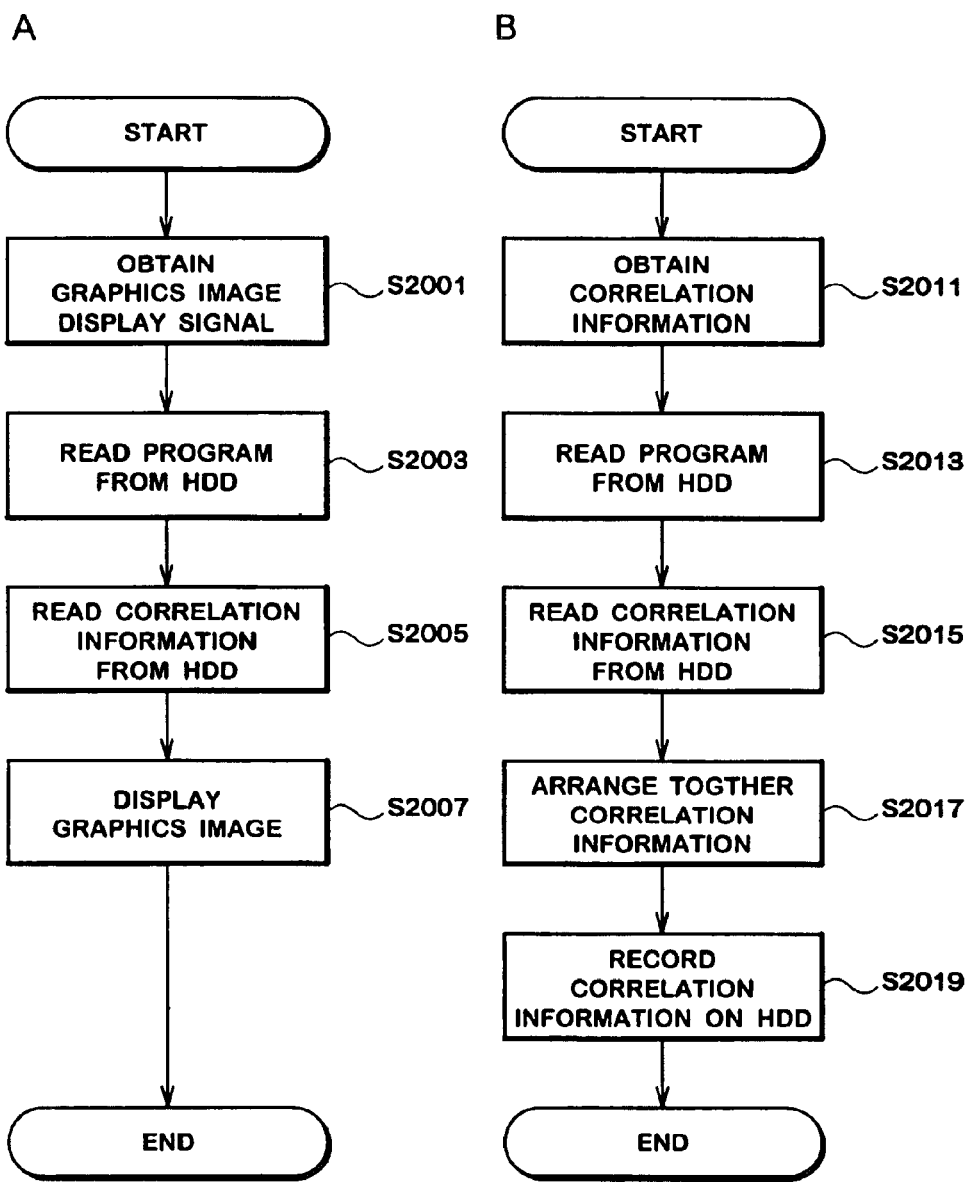
FIG. 20A shows the operation of a CPU 31 when graphics images are displayed.
FIG. 20B shows the operation of the CPU 31 when correlation information is arranged together.

The operation of the CPU 31 at this time will be described using the flow chart shown in FIG. 20A. The CPU 31, upon receiving a display signal (S2001) through a mouse or the like, reads a graphics display program recorded on the HDD 33 (S2003). It also reads correlation information recorded on the HDD 33 (S2005). A graphics image is displayed according to the correlation information as shown in FIG. 19 (S2007).

Thus, the operator can immediately learn to whom the operator is connected. Since the connected parties have some personal information, it is possible to display persons having specific information.

Figure 21:
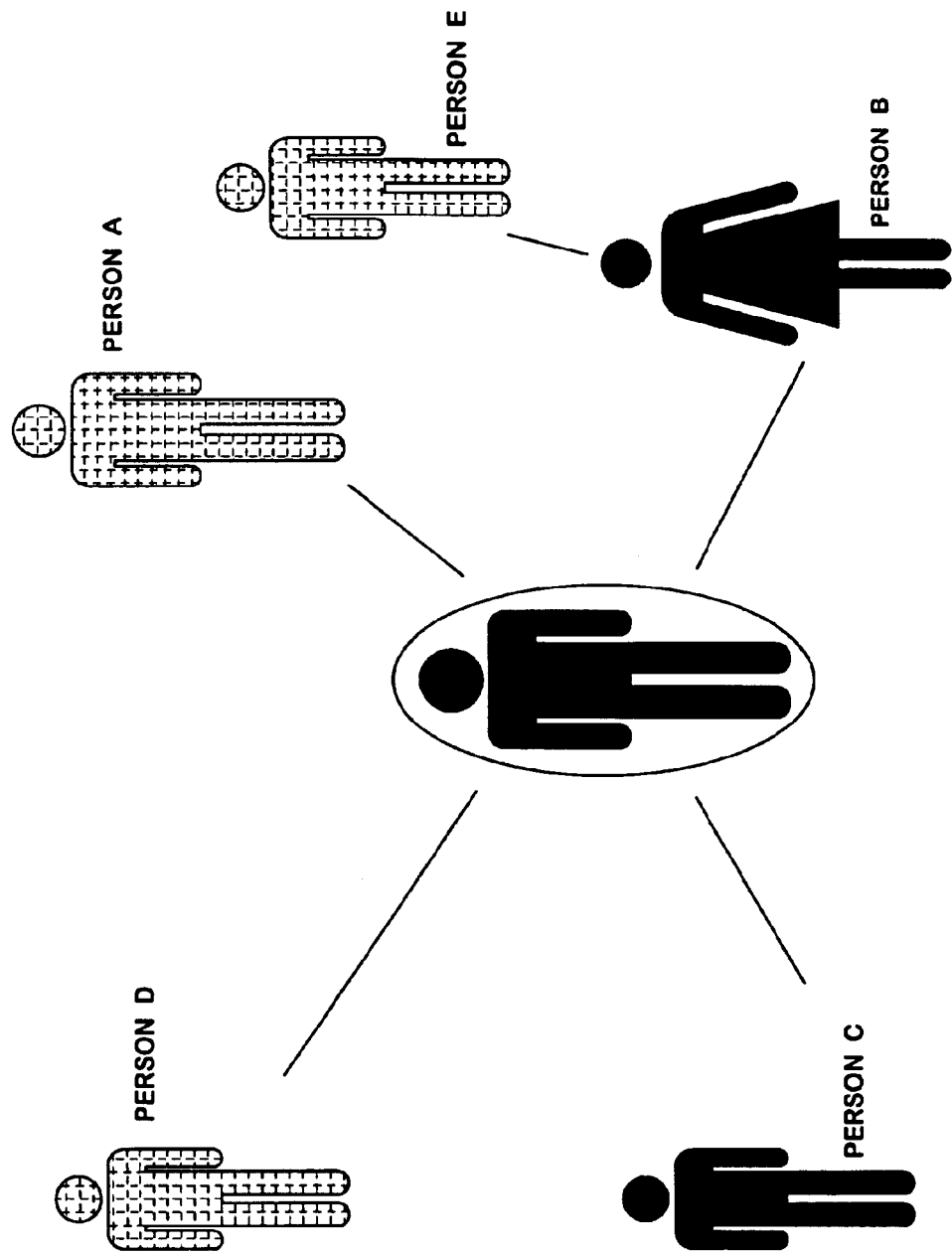
FIG. 21 shows graphics images appearing on the display 37 when the intended information is "people in their twenties."
Figure 22:
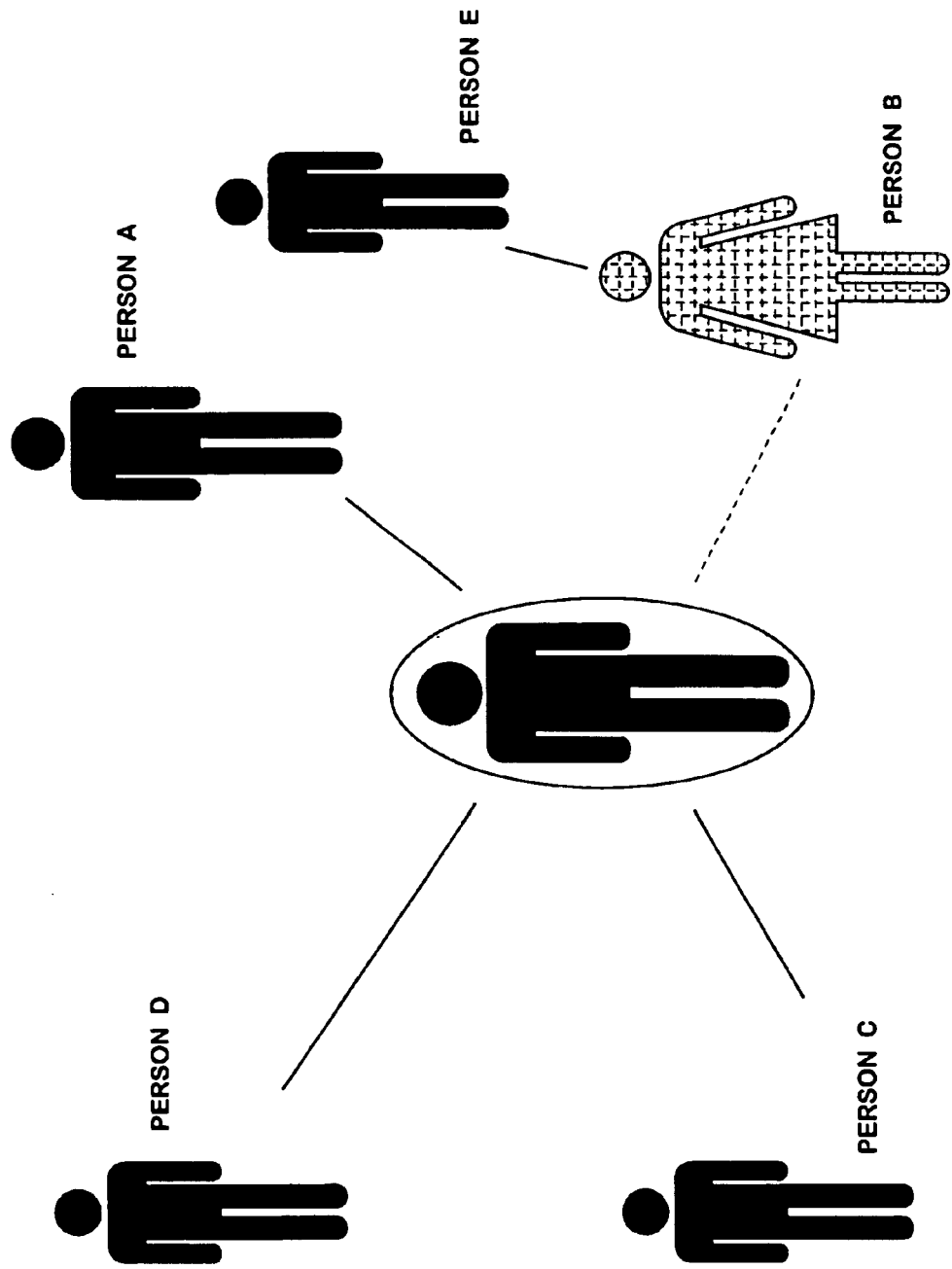
FIG. 22 shows graphics images appearing on the display 37 when the intended information is "men."

For example, it is possible that persons with information "in their twenties" and "males" matching a purpose are displayed in dark tone while those not matching are displayed in light tone. Such examples are shown in FIGS. 21 and 22. FIG. 21 shows a case "in which persons in their twenties" are made the subject of information. FIG. 22 shows a case in which "males" are made the subject of information.

Figure 24:
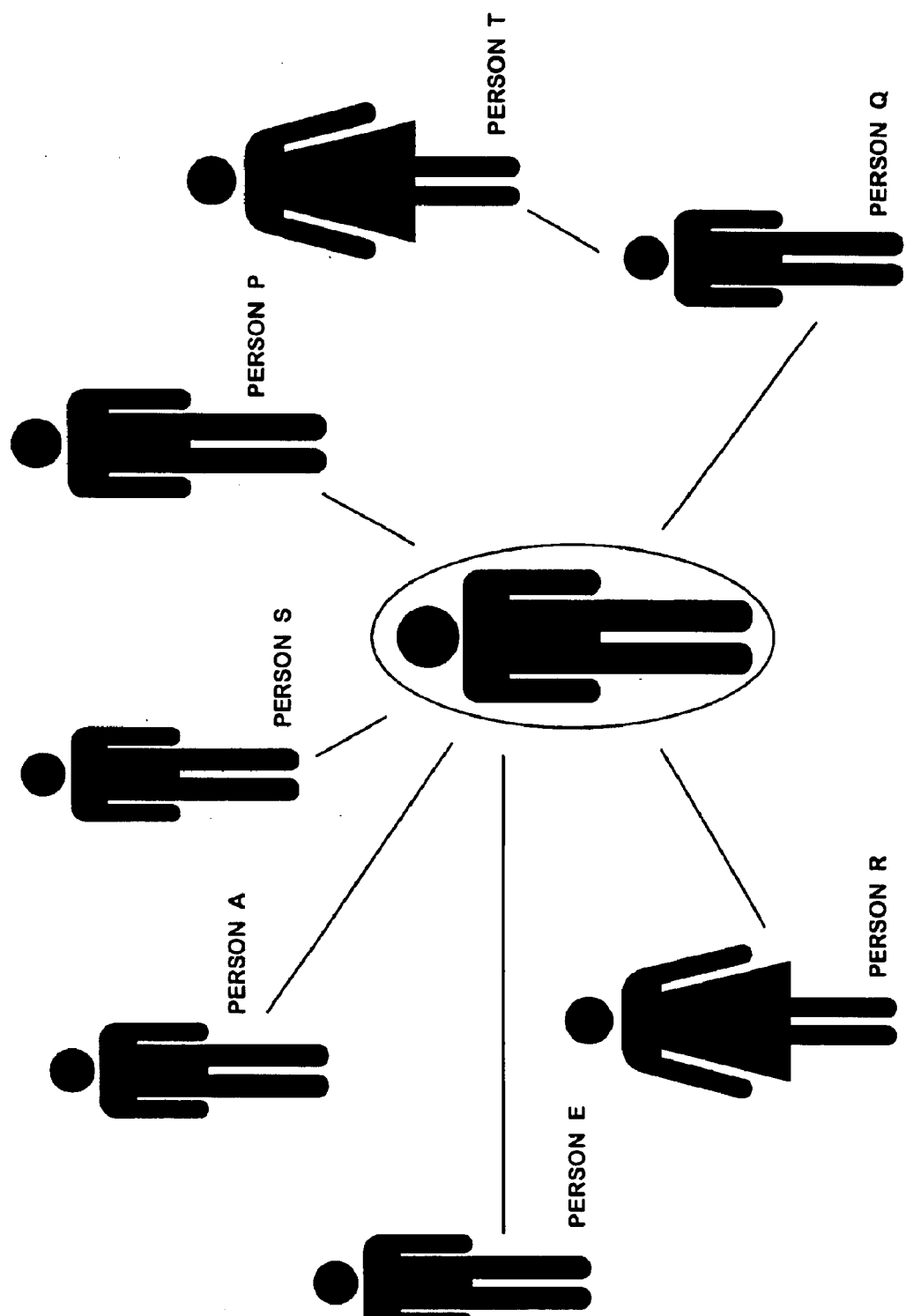
FIG. 24 is a graphical screen of correlation information possessed by the person.

Next, it is arranged that the correlation information owned by the directly connected person can be obtained. For example, a case is assumed in which the correlation information is obtained from the person B who has the information shown in FIG. 23. FIG. 24 shows the graphics image shown according to the correlation information appearing on the display 37.

The steps of the CPU 31 when arranging together the correlation information will be described in reference to the flow chart shown in FIG. 20B. The CPU 31, as it receives the correlation information from the person B (S2011), reads a program for arranging together the correlation information from the HDD 33 (S2013). Then the operator's own correlation information (See FIG. 18) recorded on the HDD 33 is read (S2015). The own correlation information is arranged together with the obtained correlation information (S2017) to produce new correlation information as shown in FIG. 25 (S2019).

The process of arranging together the correlation information will be described using FIG. 25. The CPU 31 adds the correlation information of the source party to the source party of the correlation information obtained. As shown in FIG. 25, the information, or the source party B, is added at the source party box of the person T from the persons A and E, and the check marks in the authentication boxes of the source party information are deleted. As shown in FIG. 25, the person T's authentication is deleted from the person E's data (Refer to FIG. 23).

By the way, it looks like that the authentication for the person A is retained, with the person A having its own correlation information and the obtained correlation information. However, it is that the authentication for the person A originally owned by the person A itself is retained, and that the authentication for the person A obtained has been deleted.

Figure 26:
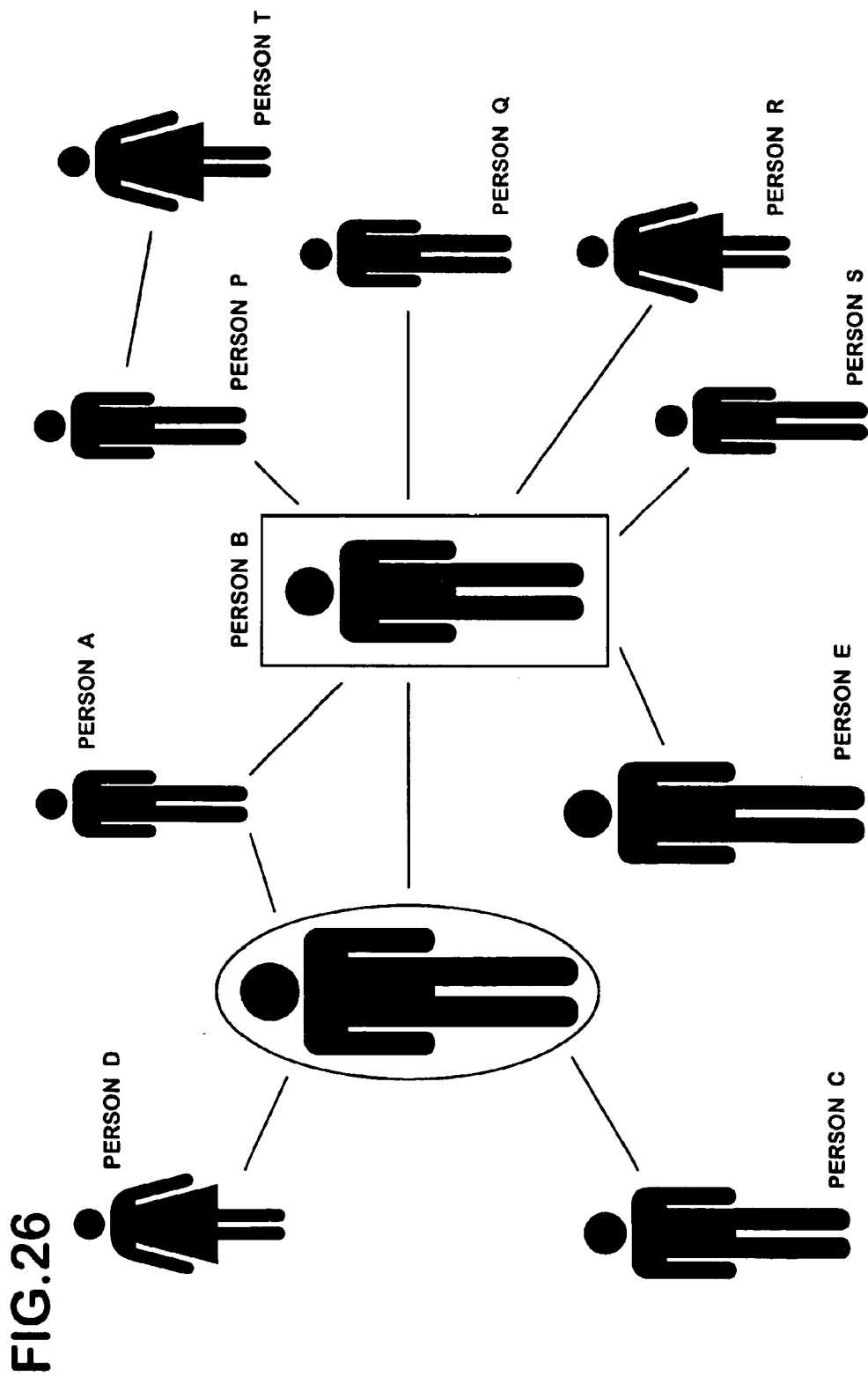
FIG. 26 is a graphical screen on the display 37 of correlation information shown in FIG. 25.

According to the correlation information newly formed as described above, the CPU 31 displays a graphics image on the display 37. The graphics image is shown in FIG. 26. Here, that the person B is enclosed in a rectangle means that the correlation information is obtained from the person B.

As described above, this embodiment makes it possible for the operator to immediately learn to whom the operator's device is connected directly or indirectly on the network. Therefore, the operator can learn a person having the possibility of becoming acquainted with the operator through somebody else's introduction even if the operator does not know the person directly. This widens the scope of information sources.

Even in the case new correlation information is created, it is possible to have a person displayed that has specific information.

Figure 27:
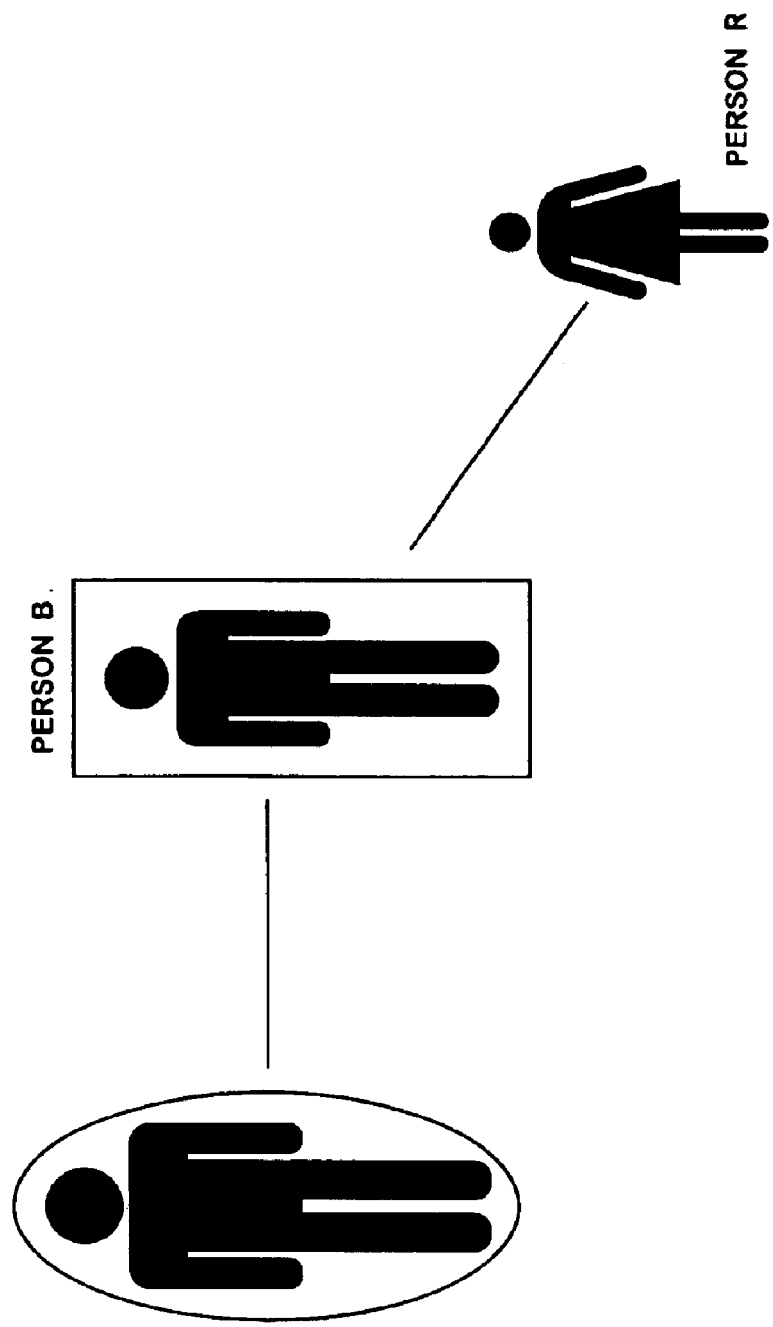
FIG. 27 is a graphical screen when the intended information is "women living in Osaka."
Figure 28:
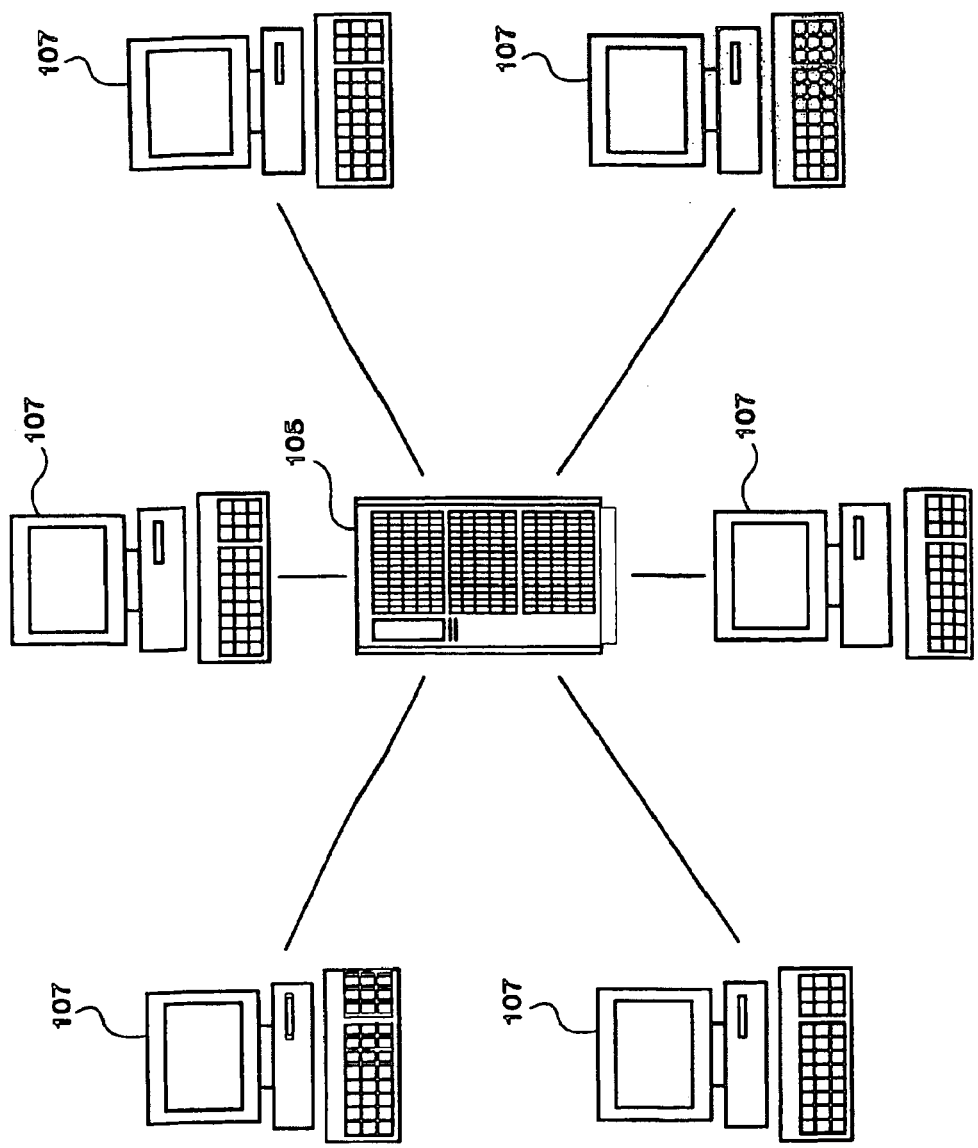
FIG. 28 shows a conventional network communication system.

For example, a graphics image when "female living in Osaka" is made the subject information is shown in FIG. 27. While FIG. 27 is made to show only the person having the target information, it is also possible to arrange like in FIGS. 21 and 22 that only persons matching the target information are displayed in dark tone while those not matching are displayed in light tone.

2. Second Embodiment

In the first embodiment described above, the hardware components of the network communication system are the host computer 23 and the PCs 25. The most conspicuous point that makes this second embodiment different from the first embodiment is the use of information communication terminals such as cellular phones instead of the PCs 25 as the hardware. The second embodiment will be hereinafter described centered on points that are different from those in the first embodiment. Other points are similar to those in the first embodiment.

2.1 Hardware Arrangement

Figure 29:
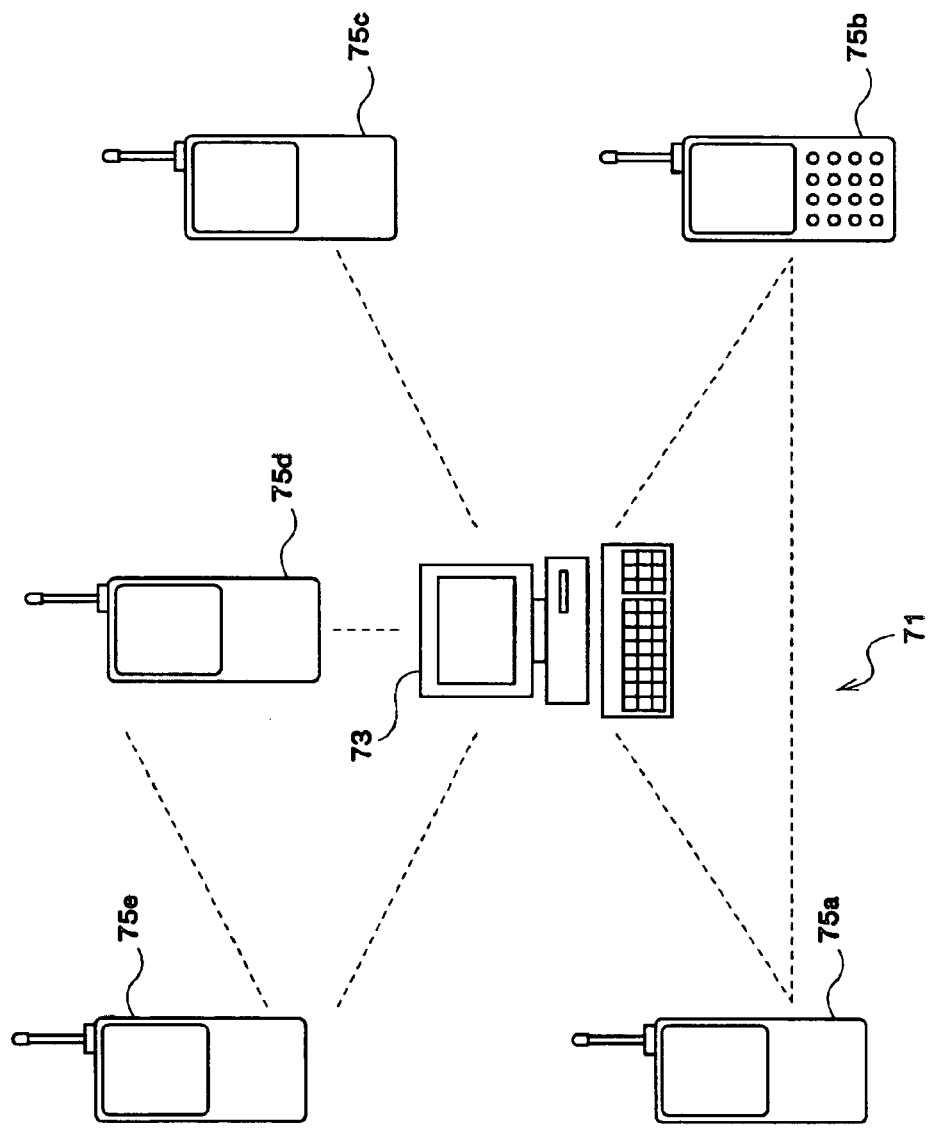
FIG. 29 shows a hardware arrangement of a network communication system as a second embodiment of the invention using a host device 73 and a cellular phone 75.

The functional block diagram of the network communication system of this embodiment is the same as that of the first embodiment. Next, the hardware arrangement of the network communication system 71 of this embodiment is shown in FIG. 29. The network communication system 71 includes a host device or a host computer 73, and first and second communication devices or cellular phones 75a to 75e.

The host computer 73 and the cellular phones 75 are interconnected through a wireless network. By the way in FIG. 29, for simplicity, the state of interconnection among the cellular phones is only partially shown.

Figure 30:
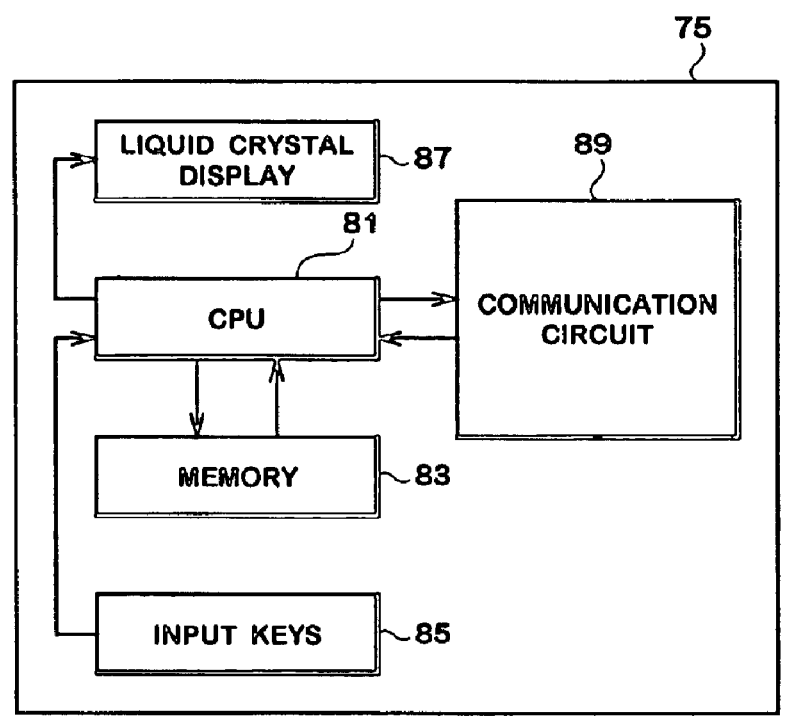
FIG. 30 shows a hardware arrangement of the cellular phone 75 shown in FIG. 29.

Next, the hardware arrangement of the cellular phone 75 is shown in FIG. 30. The cellular phone 75 has a CPU 81, a memory 83, an input key array 85, a liquid crystal display 87, and a communication circuit 89.

The memory 83 stores various programs such as a communication program. The CPU 81 executes various programs stored in the memory 83.

The cellular phone 75 receives instructions from the operator through the input key array 85. The liquid crystal display 87 displays information processed with the CPU 81.

The communication program stored in the memory 83 is for executing the processes of flow charts shown in FIGS. 5, 7A, 10A, 10B, 13A, 13B, 16A, 16B, 20A, and 20B.

Here, the correlation of the components mentioned in the claims with the components in this embodiment will be described. The primary connection information generating means corresponds to the CPU 81, the identity information generating means to the CPU 81 and the input key array 85; the major identity information generating means 13 to the CPU 81, respectively. The transmission means corresponds to the CPU 81 and the communication circuit 89.

The receiving means corresponds to the CPU 81 and the communication circuit 89; the display means to the liquid crystal display 87, the selecting means to the input key array 85; and the connecting means to the CPU 81 and the communication circuit 89.

The identity information retaining means corresponds to the CPU 81, memory 83, input key array 85, and communication circuit 89; and the identity information display means to the CPU 81, memory 83, and liquid crystal display 87, respectively.

The correlation information retaining means corresponds to the CPU 81, memory 83, input key array 85, and communication circuit 89; and the correlation information display means to the CPU 81, memory 83, and liquid crystal display 87, respectively.

Figure 31:
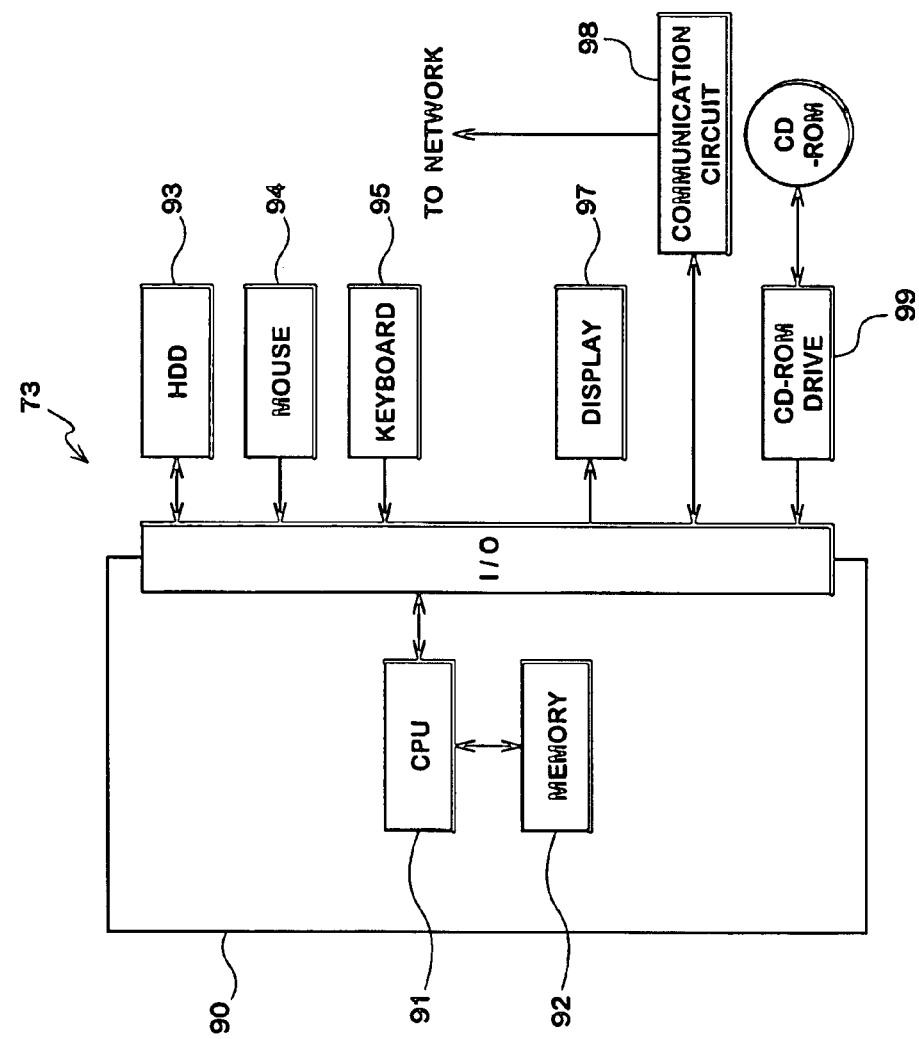
FIG. 31 shows a hardware arrangement of the host device 73 shown in FIG. 29.

Next, the hardware arrangement of the host computer 73 is shown in FIG. 31. The host computer 73 includes a main body 90 having a CPU 91 and a memory 92. It also has external devices connected to the main body 90: an HDD 93, a mouse 94, a keyboard 95, a display 97, a communication circuit 98, and a CD-ROM drive 99.

2.2 Identification

Next, the process of generating the identification as identity information will be described. A program for generating the identification is installed in the memory 83. By the way, the cellular phone 75 in this embodiment is not provided with a camera. Therefore, the identification is constituted with character information including a name, age, etc. The user of the cellular phone 75 can create identification according to the procedure the program indicates.

The operation of the cellular phone 75 when producing the identification are the same as those shown in FIG. 5. However, since the identification has no image information, the image obtaining step (S505) is dropped. Further, the user enters the character information (name, address, sex, age, etc.) using the input key array 85, etc.

FIG. 32A shows an example of identification shown on the liquid crystal display 87 of the cellular phone 75. FIG. 32B shows a message input image appearing on the liquid crystal display 87.

2.3 Phone Book

Next, FIGS. 33A and 33B show examples of display images of the phone book appearing on the display 87 on the basis of the phone book file created in the memory 83 of the cellular phone 75. When the phone book is displayed, first, a first image as shown in FIG. 33A appears.

Here are shown; a personal information display region R72 for displaying personal information, and an operation display region R75 for displaying operations. When the operator intends to select a specific person, the operator uses input keys of the key array 85 corresponding to vertical movements to bring the cursor to the person. At this time, part of the information relating to the intended person is displayed in reverse tone.

Here, input keys for lateral movements are used to move on to the second screen. The second screen comprises a source party display region R73 and an authentication display region R74. By the way, to shift from the second to the first screen, the input keys for the lateral movements are used again.

On the personal information display region R72 is displayed whole or part of the character information of the identification. This embodiment is arranged to display the name, address, sex, and age. The source party display region R73 displays from whom the identification has-been selected. The authentication display region R74 displays whether an authentication has been obtained from the subject person for the identification selected. If the authentication has been obtained, a circle (○) is displayed; if not, nothing is displayed.

The operation display region R75 displays operations such as connecting to the identification selected, deleting the selected identification from the phone book, etc. In order to connect to the selected identification, the cursor is brought to "connection" and a key corresponding to the execution is operated. As a result, the CPU 81 of the cellular phone 75 obtains the phone number of the selected identification. Then, a phone call is made according to the obtained phone number through the communication circuit 89 to make direct connection to the party called.

Here, the correlation of the components mentioned in the claims with the image of the phone book displayed on the liquid crystal display 87 shown in FIG. 33 will be described. The detailed information display region corresponds to the personal information display region R72, source party display region R73, and authentication display region R74, the authentication information display region to the authentication display region R74, and the source party display region to the source party display region R73, respectively.

Other Embodiments

While the first embodiment is arranged such that the first communication device transmits the primary connection information and the identity information to the second communication device, it may be otherwise arranged to transmit the identity information only.

Also, while the ISDN lines are used for creating the network, any network lines may be used as long as they can send out and receive data, such as analogue line network, wireless communication network, or the like.

While the phone book information is made up of the phone number, name, source party information, and authentication information, the phone book information suffices if it has at least the information (such as a name) that specifies the phone number and the party.

Moreover, while it is assumed that the correlation information and the phone book information are the same information, the embodiment is not limited by the assumption. That is, as long as the correlation information has the name of the connected party and the source party, the user may extract other information from the identification or add new information for the user's convenience.

While the second embodiment is arranged such that the cellular phone 75 does not handle image information, it may be arranged for example that a camera is connected to the cellular phone 75 so that image information can be handled.

Figure 6:
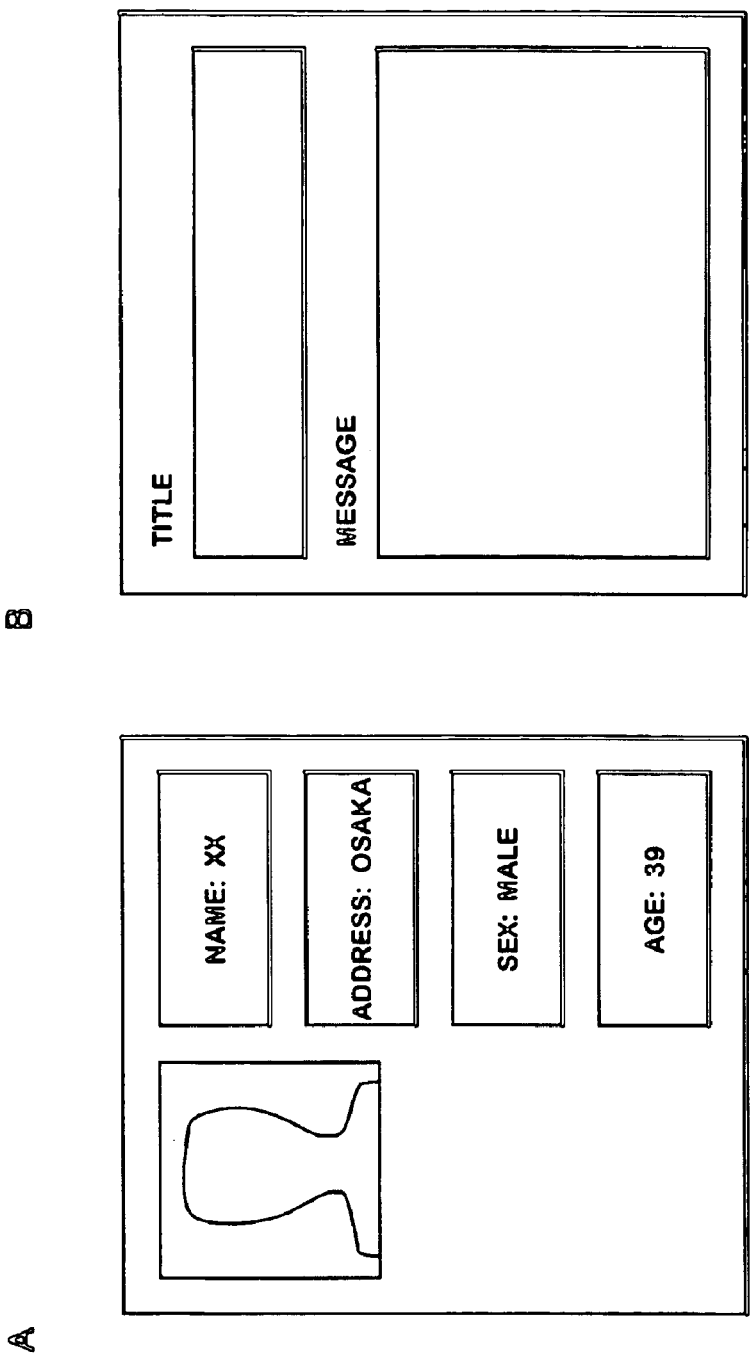
FIG. 6A shows an identification input screen.
FIG. 6B shows a message input screen.
Figure 9:
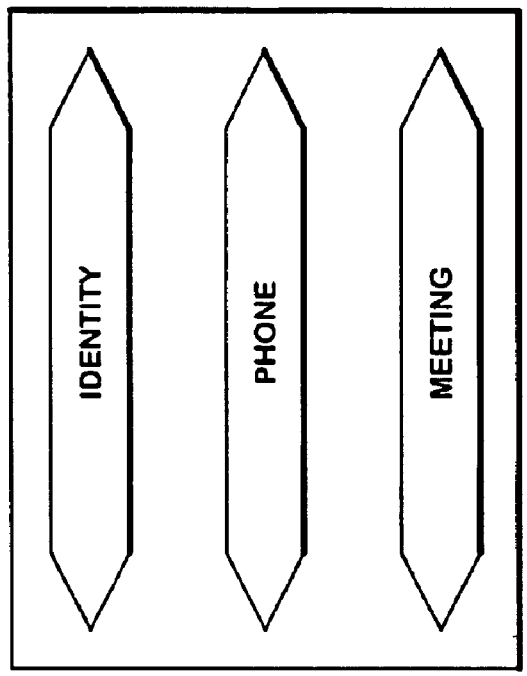
FIG. 9A shows an initial screen of a meeting displayed on the host computer 23.
FIG. 9B shows an initial screen displayed on the host computer 23.

Also, while the images appearing on the cellular phone are shown in FIGS. 32 and 33 as examples, the images may be those appearing on the PC 25 as shown in FIGS. 6, 9, and 12.

According to the invention, when the first communication device prefers direct call from the second communication device from the next occasion on, the first communication device transmits to the second communication device primary connection information for connecting to the fist communication device and the identity information for identifying the operator of the first communication device or the first communication device excluding the primary connection information. The second communication device stores and retains the primary connection information and the identification received from the first communication device. The second communication device, from the next time of connection on, shows the identity information and does not show the primary connection information to the operator. The second communication device calls up the first communication device according to the primary connection information corresponding to the identification selected.

This enables the second communication device to directly call up the first communication device. In other words, the second communication device can connect to the first communication device without intermediation of a host device. Therefore, a heavy load is not applied on a host device.

Since the first and second communication devices are directly interconnected, there is no room for a supervisor or the like to intervene in the information exchange, so the users can exchange information freely.

According to the invention, the receiving means receives the primary connection information for connecting to other communication devices, and the identity information for identifying the operator of the first communication device or the first communication device excluding the primary connection information. The storing and retaining means stores and retains the primary connection information and the identity information received.

The display means, from the next time of connection on, shows the identity information and does not show the primary connection information to the operator. The selecting means selects specific identity information. The connecting means, according to the primary connection information corresponding to the identity information selected, connects to the selected communication device corresponding to the identity information and the primary connection information.

This enables the first communication device to connect to the second without letting know the primary connection information to the operator of the second communication device. In other words, the second operator cannot know the primary connection information of the first communication device. Thus, the security of the network using these communication devices is enhanced.

According to the invention, it is possible to transmit the primary connection information and the identity information received from other communication device to a communication device other than the one corresponding to the primary connection information and the identity information.

Thus, when one communication device obtains primary connection information, etc., it can transmit it to other communication device. That is to say, one communication device (or its operator) can introduce itself to the other communication device (or its operator) through itself. Therefore, like in the human society, the circle of acquaintances can be widened also in the network society.

According to the invention, in the case primary connection information and identity information received from other communication device do not correspond to the communication device, a connection is made to a communication device that corresponds to the received primary connection information to obtain an authentication from the connected communication device to the effect that the primary connection information and the identity information may be transmitted from the communication device to other communication devices, and only then the communication device can transmit the primary connection information and the identity information it has received to a communication device other than the communication device in question.

This can prevent an operator's own primary connection information and identity information from being propagated without being known to the operator. Therefore, the use of this communication device makes it possible to create a network of high degree of security.

According to the invention, the above-mentioned authentication is obtained if the communication device is directly connected to a communication device corresponding to the primary connection information and the identity information. Therefore, the operator can give out an authentication to the effect that the primary connection information and the identity information may be transmitted simply by connecting to other communication device. In other words, the authentication can be given by a simple operation such as whether or not other communication device is connected.

According to the invention, when the authentication is obtained, "that an authentication is obtained" is displayed in a visible form. This enables the user of this communication device to easily confirm whether or not an authentication has been obtained.

According to the invention, when a specific information is selected from the operator's own identity information, from whom the selected identity has been obtained is displayed. This enables the user of this communication device to easily confirm from whom the identity information has been obtained.

According to the invention, correlation information representing the correlation of a communication device with another communication device directly connected to the communication device is shown in a visible form. This enables an operator to easily know the party to which the operator's own communication device is connected.

According to the invention, a communication device receives from other communication device directly connected to it the correlation information the communication device has, arranges together the operator's own correlation information and the received correlation information to produce new correlation information, and displays it in a visible form. This enables the operator to visually confirm not only the communication device to which the operator's own communication device is connected but also the communication device connected to the communication device connected to the operator's communication device. In other words, the connection relation can be confirmed in a wide perspective.

According to the invention, when any correlation information is selected from entire correlation information, the selected correlation information only is displayed in a visible form. This enables the operator to easily know which route to follow in order to obtain information for connecting to a specific communication device.

According to the invention, when any correlation information is selected, the correlation information selected and the correlation information other than that selected are separately displayed. This enables the user of this communication device to easily confirm the difference between two pieces of information.

According to the invention, a primary connection information generating means produces primary connection information for connecting to the communication device. An identity information generating means produces identity information that is for specifying an operator or a communication device and does not include primary connection information. A transmitting means transmits the primary connection information and the identity information to other communication devices.

This enables the operator of a communication device to transmit to other communication device the primary connection information for directly connecting to the operator's communication device. Therefore, the communication device can make direct connection to other communication device that receives the primary connection information.

According to the invention, a first communication device transmits to the host device the primary connection information for making connection to the fist communication device and the major identity information for identifying the operator of the first communication device or the first communication device excluding the primary connection information. The host device stores and retains the primary connection information and the major identity information received from the first ommunication device, does not disclose the primary connection information to the users of communication devices trying to gain access to the host device, discloses the major identity information to those users, transmits to a second communication device the primary connection information corresponding to the major identity information selected by the second communication device. The second communication device makes connection to the first communication device according to the primary connection information received.

This enables the second communication device to make direct connection to the first communication device. Therefore, both of the communication devices can interact without an intermediate host device.

According to the invention, the primary connection information generating means produces primary connection information for making connection to other communication devices. The major identity generating means produces major identity information for identifying the operator or the communication device excluding the primary connection information. The transmitting means transmits the primary connection information and the major identity information to a host device.

This enables a first communication device to provide information for a second communication devices to make direct connection to the first communication device. Therefore, use of this communication device makes it possible to form a network for mutual communication without an intermediate host device.

According to the invention, it is possible to cause a computer to receive primary information for making connection to other communication devices and identity information for identifying the operator of the communication device or the communication device excluding the primary connection information, to store and retain the primary connection information and the identity information caused to be received, to show the identity information but not to show the primary connection information to the operator from the next occasion of connection on, and to connect to a communication device corresponding to the identity information and the primary connection information according to the primary connection information corresponding to the identity information selected.

This enables the communication device in which a communication program is installed from a recording medium to call up other communication devices directly. That is, connection to other communication devices is possible without an intermediate host device. Therefore, use of the communication device in which a communication program is installed from the recording medium makes it possible to constitute a network system free from a heavy load on the host device.

Moreover, the communication devices in which a communication program is installed from the recording medium can interconnect directly. Therefore, intention of a supervisor does not intervene in information exchange, and information can be freely exchanged without being disturbed by the intention of the supervisor.

According to the invention, it is possible to cause a computer to generate primary connection information for making connection to a communication device and identity information for identifying the operator or the communication device excluding the primary connection information, and to transmit the primary connection information and the identity information to other communication devices.

This enables a first communication device in which a communication program is installed from the recording medium to transmit to a second communication device primary connection information, etc. for the second communication device to make direct connection to the first communication device.

According to the invention, it is possible to cause a computer to generate primary connection information for making connection to other communication devices and major identity information for identifying the operator or the communication device excluding the primary connection information, and to transmit the primary connection information and the major identity information to the host device.

This enables a first communication device in which a communication program is installed from the recording medium to transmit to a second communication device information for the second communication device to make direct connection to the first communication device. Therefore, the use of the communication device in which a communication program is installed from the recording medium makes it possible to constitute a network system for mutual communication without an intermediate host device.

According to the invention, the detailed information display region has an authentication information display region to show whether or not an authentication has been obtained from other communication device to the effect that primary connection information and identity information may be transmitted from the communication device to a third party communication device.

Therefore, the user of the communication device of the invention can immediately confirm whether or not an authentication has been obtained for certain primary connection information and identity information.

According to the invention, the detailed information display region further has a source party display region to show source party information indicating "from which communication device the identity information currently being noted has been obtained" about the correlation information indicating the correlation between a communication device and another communication device being directly connected to the first communication device.

Therefore, the user of the communication device of the invention can immediately confirm from whom certain identity information has been obtained.

According to the invention, the correlation information display means displays specific pieces of information out of whole correlation information discriminately from other pieces of information.

Therefore, the user of the communication device of the invention can confirm the correlation information having specific pieces of information by simply confirming on the display means.

The invention has been described above in the form of preferred embodiments. The terms used are for the purpose of explanation and not for limitation. Therefore, the embodiments may be modified within the scope of the appended claims without departing from the scope and spirit of the invention.

What is claimed is:

1. A network communication system comprising:
   at least a host device;
   a first communication device; and
   a second communication device,
   wherein the second communication device is connected with the first communication device by obtaining from the host device primary connecting information for connecting to the first communication device,
   wherein when the first communication device prefers a direct call from the second communication device in the future, the first communication device sends to the second communication device identity information for identifying one of an identity for an operator of the first communication device and an identity for the first communication device, the identity information including none of the primary connecting information,
   wherein the second communication device stores the primary connecting information from the host device and the identity information from the first communication device,
   wherein for future communications, the second communication device displays the identity information to the operator of the second communication device, and
   wherein the second communication device calls for the first communication device in accordance with the primary connecting information corresponding to a selecting of the identity information.

2. A method for operating a network communication system including at least a host device, a first communication device, and a second communication device, the method comprising the steps of:
   connecting the second communication device with the first communication device by obtaining from the host device primary connecting information for connecting to the first communication device;
   when the first communication device prefers a direct call from the second communication device in the future, sending to the second communication device identity information for identifying one of an identity for an operator of the first communication device and an identity for the first communication device by the first communication device, the identity information including none of the primary connecting information, and the identity information being sent from the first communication device;
   storing the primary connecting information from the host device and the identity information from the first communication device within the second communication device;
   for future communications, displaying the identity information but none of the primary connecting information to an operator of the second communication device by the second communication device; and
   calling for the first communication device by the second communication device in accordance with the primary connecting information corresponding to a selecting of the identity information.

3. A first communication device comprising:
   receiving means for receiving identity information for identifying one of an identity for an operator of a second communication device and an identity for the second communication device, and for receiving primary connecting information for connecting to the second communication device, the identity information including none of the primary connecting information;
   storage means for storing the identity information and the primary connecting information;
   display means for displaying the identity information but none of the primary connecting information to an operator of the first communication device for future communications;
   selecting means for selecting the identity information; and
   connecting means for connecting to the second communication device in accordance with the primary connecting information corresponding to the selected identity information.

4. The first communication device in accordance with claim 3, wherein the first communication device is capable of sending to a third communication device, the identity information and the primary connecting information.

5. The first communication device in accordance with claim 4, wherein the first communication device contacts the second communication device, and on receipt of an authorization from the second communication device indicating that the identity information and the primary connecting information may be sent to a third communication device from the first communication device, the first communication device is able to send to the third communication device the primary connecting information and the identity information.

6. The first communication device in accordance with claim 4, wherein when a certain piece of identity information is selected from self-owned identity information, the first communication device specifies and displays a communication device from which the selected certain piece of identity information is obtained.

7. The first communication device in accordance with claim 4, wherein the first communication device displays information on a relative relationship between another communication device which is directly connected to the first communication device and the first communication device.

8. The first communication device in accordance with claim 5, wherein the first communication device displays information on a relative relationship between another communication device which is directly connected to the first communication device and the first communication device.

9. The first communication device in accordance with claim 5, wherein the authorization is obtained when the first communication device is directly connected to the second communication device.

10. The first communication device in accordance with claim 5, wherein a message indicating that an authorization being given is displayed when the authorization is obtained.

11. The first communication device in accordance with claim 5, wherein when a certain piece of identity information is selected from self-owned identity information, the first communication device specifies and displays a communication device from which the selected certain piece of identity information is obtained.

12. The first communication device in accordance with claim 9, wherein a message indicating that an authorization being given is displayed when the authorization is obtained.

13. The first communication device in accordance with claim 9, wherein when a certain piece of identity information is selected from self-owned identity information, the first communication device specifies and displays a communication device from which the selected certain piece of identity information is obtained.

14. The first communication device in accordance with claim 9, wherein the first communication device displays information on a relative relationship between another communication device which is directly connected to the first communication device and the first communication device.

15. The first communication device in accordance with claim 3, wherein a message indicating that an authorization being given is displayed when the authorization is obtained.

16. The first communication device in accordance with claim 15, wherein when a certain piece of identity information is selected from self-owned identity information, the first communication device specifies and displays a communication device from which the selected certain piece of identity information is obtained.

17. The first communication device in accordance with claim 15, wherein the first communication device displays information on a relative relationship between another communication device which is directly connected to the first communication device and the first communication device.

18. The first communication device in accordance with claim 3, wherein when a certain piece of identity information is selected from self-owned identity information, the first communication device specifies and displays a communication device from which the selected certain piece of identity information is obtained.

19. The first communication device in accordance with claim 18, wherein the first communication device displays information on a relative relationship between another communication device which is directly connected to the first communication device and the first communication device.

20. The first communication device in accordance with claim 3, wherein the first communication device displays information on a relative relationship between another communication device which is directly connected to the communication device and the communication device.

21. The first communication device in accordance with claim 20, wherein when a desired relative information is selected, the communication device distinguishably displays the selected relative information and unselected relative information.

* * * * *